US012385290B2

(12) United States Patent
Wang et al.

(10) Patent No.: US 12,385,290 B2
(45) Date of Patent: Aug. 12, 2025

(54) LOCKING METHOD FOR AN ELECTRONIC DEVICE AND ELECTRONIC DEVICE LOCKING APPARATUS

(71) Applicant: SINOX CO., LTD, New Taipei (TW)

(72) Inventors: Chia-Hung Wang, New Taipei (TW); Chia-Ming Wu, New Taipei (TW); Kuo-Kuang Pan, New Taipei (TW)

(73) Assignee: Sinox Co., Ltd., New Taipei (TW)

( * ) Notice: Subject to any disclaimer, the term of this patent is extended or adjusted under 35 U.S.C. 154(b) by 403 days.

(21) Appl. No.: 17/811,454

(22) Filed: Jul. 8, 2022

(65) Prior Publication Data

US 2023/0228128 A1 Jul. 20, 2023

(30) Foreign Application Priority Data

Jan. 18, 2022 (TW) ................................ 111102068

(51) Int. Cl.
*E05B 73/00* (2006.01)
*E05B 37/02* (2006.01)

(52) U.S. Cl.
CPC .......... *E05B 73/0082* (2013.01); *E05B 37/02* (2013.01)

(58) Field of Classification Search
CPC ............................ E05B 73/0082; E05B 37/02
See application file for complete search history.

(56) References Cited

U.S. PATENT DOCUMENTS 5,957,510 A 9/1999 Kuo
2020/0248477 A1* 8/2020 Wu ...................... E05B 15/008
2021/0032907 A1 2/2021 Yuan et al.
2022/0205283 A1* 6/2022 Yang .................. E05B 73/0082
2023/0133788 A1* 5/2023 Yang .................. E05B 73/0082 70/58
2023/0135591 A1* 5/2023 Yang .................. E05B 73/0082 70/51
2023/0139662 A1* 5/2023 Yang .................. E05B 73/0005 70/58

FOREIGN PATENT DOCUMENTS

| | | | | |
|---|---|---|---|---|
| CN | 202625026 U | | 12/2012 | |
| KR | 1020130131694 A | | 12/2013 | |
| TW | 201002927 A | | 1/2010 | |
| TW | M572919 U | | 1/2019 | |
| TW | M610711 U | | 4/2021 | |
| TW | 202130893 A | | 8/2021 | |
| WO | WO-2021157355 A1 | * | 8/2021 | E05B 63/0056 |

* cited by examiner

*Primary Examiner* — Christine M Mills
*Assistant Examiner* — Christopher F Callahan
(74) *Attorney, Agent, or Firm* — Rosenberg, Klein & Lee

(57) ABSTRACT

A locking method for an electronic device includes steps of: (a) adjusting working stages of an electronic device locking apparatus according to a size of an anti-theft hole of an electronic device; (b) inserting a fixing member into the anti-theft hole; and (c) switching a lock to a locking state, such that the electronic device locking apparatus and the electronic device are inseparable. Movements of the working stages and the fixing member are separate. The working stages can be adjusted in advance, and then the fixing member is inserted into and is unfolded to engage in the anti-theft hole. When unlocking, just folding the fixing member and then the fixing member can leave the anti-theft hole. The fixing member can be used to engage in the anti-theft hole of the same size, directly without changing the working stage, which is convenient to use.

4 Claims, 27 Drawing Sheets

LOCKING METHOD FOR AN ELECTRONIC DEVICE AND ELECTRONIC DEVICE LOCKING APPARATUS

BACKGROUND OF THE INVENTION

1. Field of the Invention

The present invention relates to a locking method for an electronic device, especially to a locking method for a laptop computer.

2. Description of the Prior Art(s)

A conventional electronic device, especially a portable electronic device such as a laptop computer, usually has an anti-theft hole that is used along with a specific lock such as a laptop lock, so as to lock the laptop computer at a specific location and prevent the laptop computer from being stolen.

Anti-theft holes of conventional laptop computers are available in at least three different widths. Accordingly, manufacturers also develop multi-stage adjustable locks that can be adjusted to a proper stage, so as to be locked in the anti-theft hole of the conventional laptop computer.

A conventional multi-stage adjustable lock, regardless of stepped type (such as three-stage typed) or stepless type, is inserted into the anti-theft hole of the laptop computer with two hooks when in use, and then working stage of the conventional multi-stage adjustable lock is switched (such as by turning a knob) to unfold the two hooks to engage in the anti-theft hole. Afterwards, depending on type of the combinational multi-stage adjustable lock, by pulling out a key from a key lock or scrambling sequence of numbers of a combination lock, the two hooks are unable to be folded and leave the anti-theft hole.

However, when unlocking the conventional multi-stage adjustable lock by inserting the key or arranging the numbers in a correct sequence, the working stage has to be adjusted reversely (such as turning the knob in a reverse direction) to fold the two hooks to a minimum angle, such that the multi-stage adjustable lock can be separated front the laptop computer. The problem is, when connecting to the laptop computer next time, the working stage has to be switched again to fit the anti-theft hole. Even if the conventional multi-stage adjustable lock is connected to the same laptop computer having the same size of the anti-theft hole in most instances, the working stage has to be switched every time when the conventional multi-stage adjustable lock is reconnected to the laptop computer, which is inconvenient for use.

To overcome the shortcomings, the present invention provides a locking method for an electronic device and art electronic device locking apparatus to mitigate or obviate the aforementioned problems.

SUMMARY OF THE INVENTION

The main objective of the present invention is to provide a locking method for an electronic device, and the locking method includes steps of:

(a) adjusting working stages of an electronic device locking apparatus according to a size of an anti-theft hole of an electronic device;

(b) inserting a fixing member of the electronic device locking apparatus into the anti-theft hole of the electronic device; and (c) switching a lock of the electronic device locking apparatus to a locking state, so as to fix the fixing member of the electronic device locking apparatus to engage in the anti-theft hole of the electronic device with a selected one of the working stages, such that the electronic device locking apparatus and the electronic device are inseparable.

The main objective of the present invention, is to provide an electronic device locking apparatus that is configured to secure an electronic device with an anti-theft hole. The electronic device locking apparatus has a fixing member, a stage adjusting mechanism, a driving mechanism, and a lock. The fixing member is configured to be inserted in the anti-theft hole of the electronic device. The stage adjusting mechanism is configured to adjust the electronic device locking apparatus to multiple working stages. The driving mechanism is connected with the fixing member and the stage adjusting mechanism and selectively unfolds the fixing member to engage in the anti-theft hole based on a current one of the working stages to which the stage adjusting mechanism adjusts. When the lock is locked, the stage adjusting mechanism is fixed at the current one of the working stages by the lock.

In the electronic device locking apparatus of the present invention, adjustment of the working stages (including stepped or stepless form) and operation of the fixing member (such as unfolding two hooks) are separate. In other words, movements (unfolding or folding) of the fixing member do not interfere in the working stages to which the stage adjusting mechanism adjusts. Therefore, the stage adjusting mechanism can be adjusted to a proper one of the working stages in advance, and then the fixing member is inserted into and is unfolded to engage in the anti-theft hole. When unlocking, just folding the fixing member and then the fixing member can leave the anti-theft hole. Since the working stage does not have to be changed, the fixing member can be used to engage in the anti-theft hole of the same size directly in the future. The working stage do not have to be adjusted, which is convenient to use.

Other objectives, advantages and novel features of the invention will become more apparent from the following detailed description when taken in conjunction with the accompanying drawings.

DETAILED DESCRIPTION OF THE PREFERRED EMBODIMENTS

A locking method for an electronic device in accordance with the present invention includes the following steps:

(a) Adjusting working stages of an electronic device locking apparatus according to a size (such as a width) of an anti-theft hole of an electronic device;

(b) Inserting a fixing member of the electronic device locking apparatus into the anti-theft hole of the electronic device, wherein the fixing member has a folding state for leaving the anti-theft hole and an unfolding state for engaging in the anti-theft hole, and the fixing member is in the folding state when being inserted into the anti-theft hole;

(c) Switching a lock of the electronic device locking apparatus to a locking state, so as to fix the fixing member of the electronic device locking apparatus to engage in the anti-theft hole of the electronic device with a selected one of the working stages. Thus, the electronic device locking apparatus and the electronic device are inseparable (cannot depart from each other). The process of switching the fixing member from the folding state to the selected one of the working stage may or may not be related to switching the lock to the locking state. However, the lock in the locking state can ensure that the fixing member is unable to be switched to the other working stage or the folding state.

Preferably, the electronic device is a portable electronic device. Specifically, the electronic device may be, but is not limited to, a laptop computer.

Figure 1:
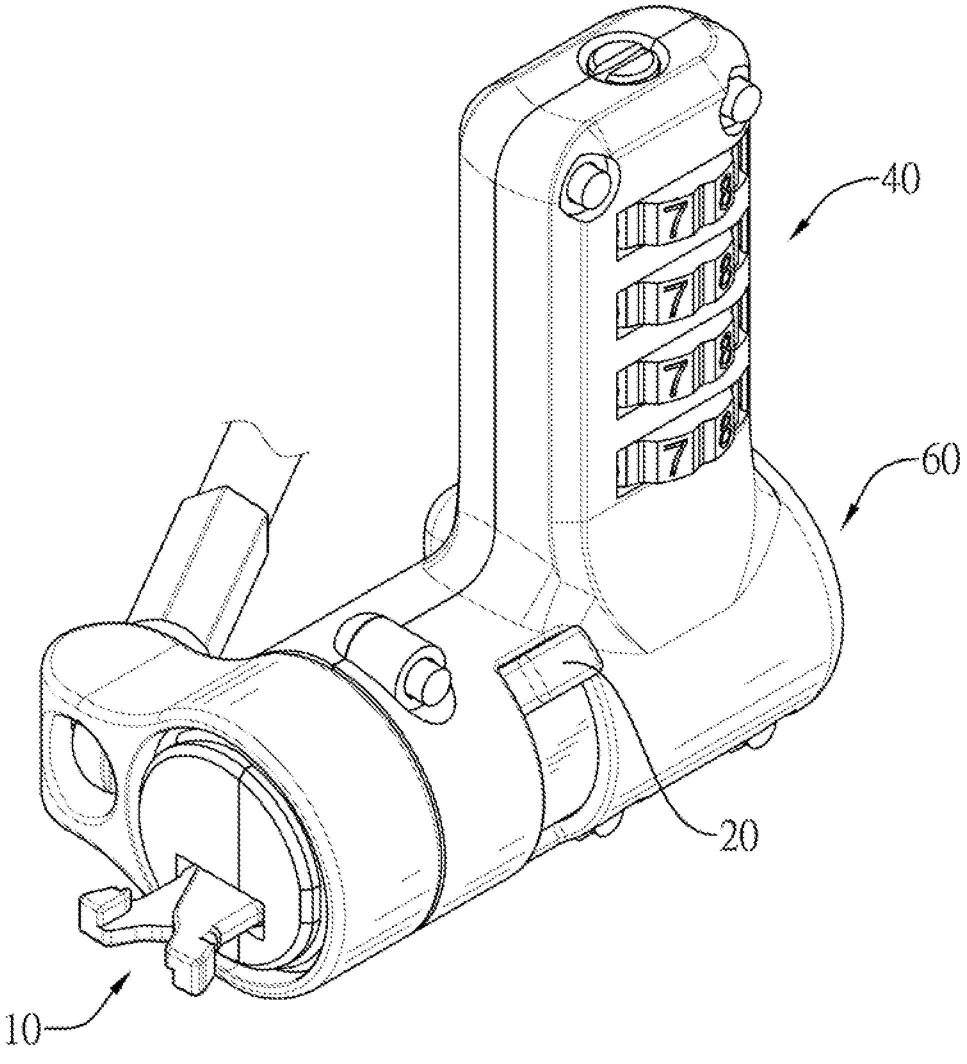
FIG. 1 is a perspective view of a first embodiment of an electronic device locking apparatus in accordance with the present invention.
Figure 2:
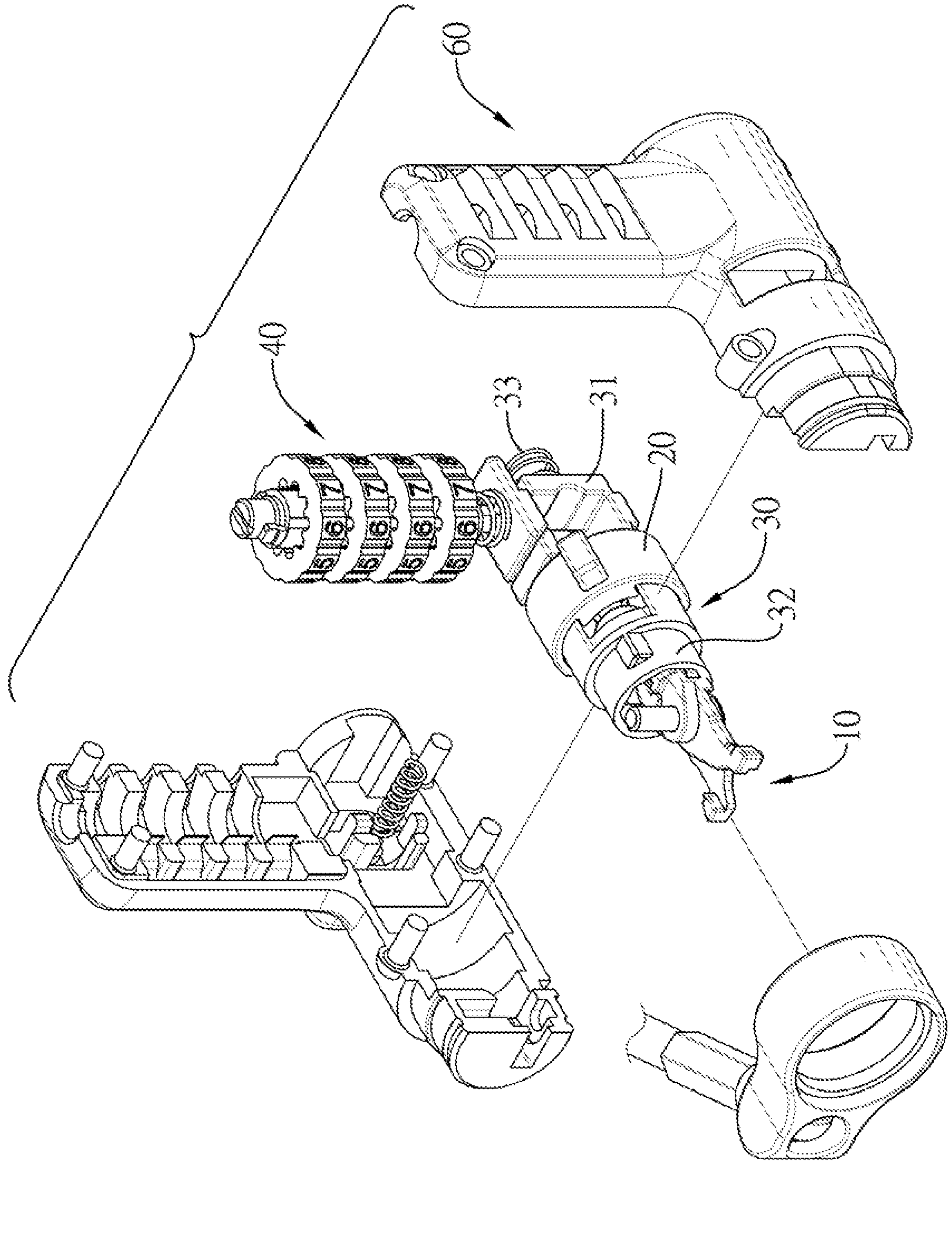
FIG. 2 is an exploded perspective view of the first embodiment of the electronic device locking apparatus in FIG. 1.

With reference to FIGS. 1 and 2, an electronic device locking apparatus in accordance with the present invention comprises a fixing member 10, a stage adjusting mechanism 20, a driving mechanism 30, and a lock 40.

With reference to FIGS. 3 to 5 and 8, the fixing member 10 is configured to be inserted in the anti-theft hole of the electronic device. In the preferred embodiments, the fixing member 10 includes two hooks 11 and a hook resilient element 12. The two hooks 11 are pivotally connected with each other. The hook resilient element 12 connects the two hooks 11, so as to unfold or fold the two hooks 11 in a normal state. However, a structure of the fixing member 10 is not limited to the structure as described above.

Figure 5:
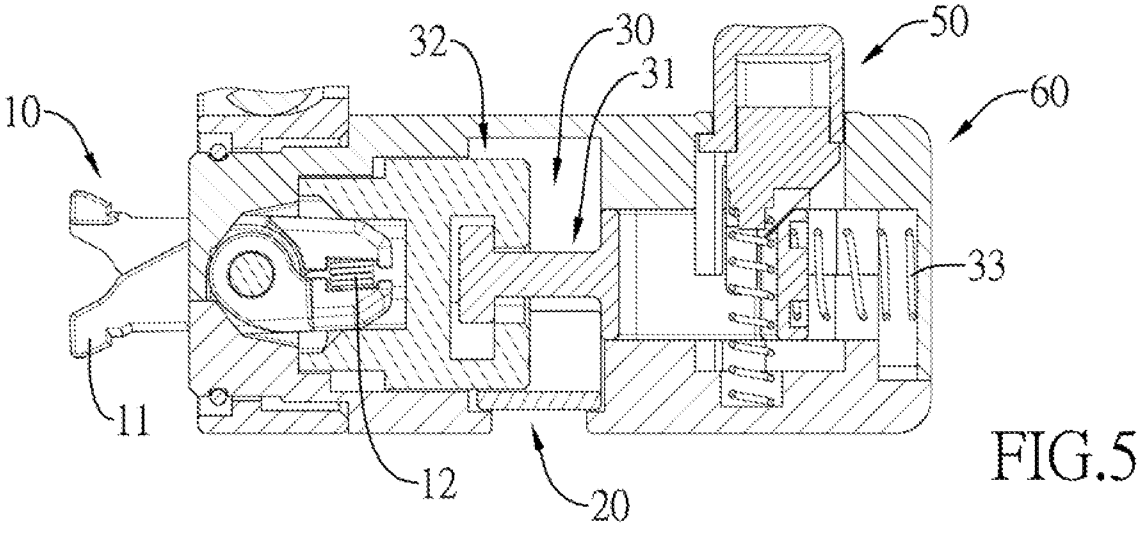
FIGS. 5 to 7 are operational cross-sectional top views of the first embodiment of the electronic device locking apparatus in FIG. 1.
Figure 6:
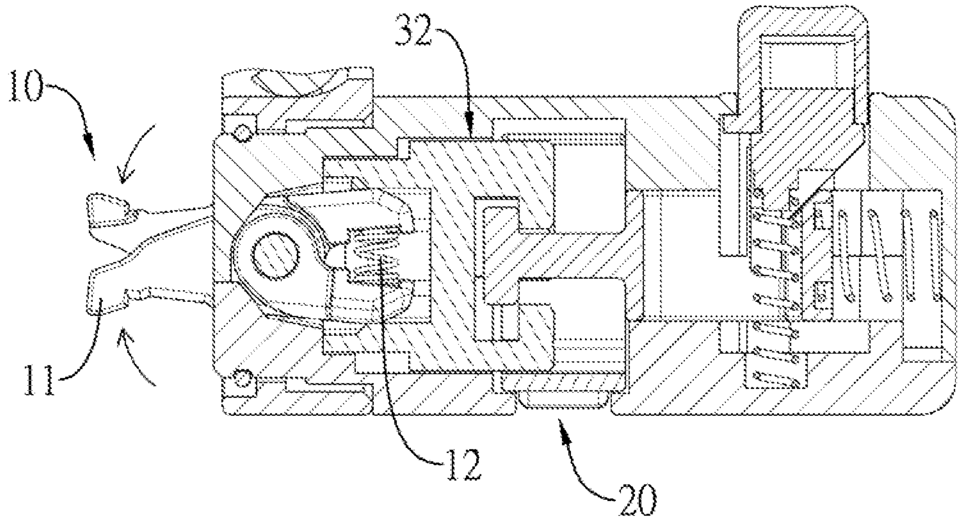

The stage adjusting mechanism 20 is configured to adjust the electronic device locking apparatus to multiple working stages and may adjusts in stepped or stepless form. As shown in FIGS. 5 and 6, in different working stages, the fixing member 10 is unfolded to different degrees, such that the fixing member 10 is available for engaging in the anti-theft holes of different sizes.

The driving mechanism 30 is connected with the fixing member 10 and the stage adjusting mechanism 20 and selectively unfolds the fixing member 10 to engage in the anti-theft hole based on a current one of the working stages to which the stage adjusting mechanism 20 adjusts.

When the lock 40 is locked, the stage adjusting mechanism 20 is fixed at the current one of the working stages b the lock 40 directly or indirectly. That is, the fixing member 10 is unable to be switched to other working stages or be folded.

In the present invention, the stage adjusting mechanism 20 and the fixing member 10 act (such as unfolding the two hooks 11) separately. In other words, movements (unfolding or folding) of the fixing member 10 do not interfere in the working stages to which the stage adjusting mechanism 20 adjusts. Therefore, the stage adjusting mechanism 20 can be adjusted to a proper one of the working stages in advance, and then the fixing member 10 is inserted into and is unfolded to engage in the anti-theft hole. When unlocking, just folding the fixing member 10 and then the fixing member 10 can leave the anti-theft hole. Since the working stage does not have to be changed, the fixing member 10 can be used to engage in the anti-theft hole of the same size directly. The working stage do not have to be adjusted, which is convenient to use.

The electronic device locking apparatus of the present invention has six embodiments as follows.

With reference to FIGS. 1 to 10, a first embodiment of the electronic device locking apparatus in accordance with the present invention is shown. With reference to FIGS. 3 to 5 and 8, the driving mechanism 30 includes a central shaft 31.

The central shaft 31 is movable toward the fixing member 10 to unfold the fixing member 10 to engage the anti-theft hole based on a current one of the working stages to which the stage adjusting mechanism 20 adjusts. The central shall 31 is not limited to be shaped into a thin rod and may also be shaped in various shapes such as cylinder. The central shaft 31 may moves to directly push to unfold the fixing member 10, or the central shaft 31 may push to unfold the fixing member 10 indirectly via other components. In the first embodiment, the driving mechanism 30 further includes a rotating member 32 disposed between the central shaft 31 and the fixing member 10 and connected with the stage adjusting mechanism 20. The rotating member 32 is rotated to different angles based on the working stages to which the stage adjusting mechanism 20 adjusts, as shown in FIGS. 5 and 6. In the first embodiment, the stage adjusting mechanism 20 is radially exposed to, but not necessarily protrudes to, an outside of a housing 60, so as to allow a user to adjust the working stages. Preferably, the user can rotate the rotating member 32 indirectly through pulling the stage adjusting mechanism 20. When the central shaft 31 is moved to the fixing member 10, the central shaft 31 pushes the rotating member 32 to push to unfold the fixing member 10 to a corresponding one of the angles based on the current one of the working stages to which the stage adjusting mechanism 20 adjusts.

Figure 3:
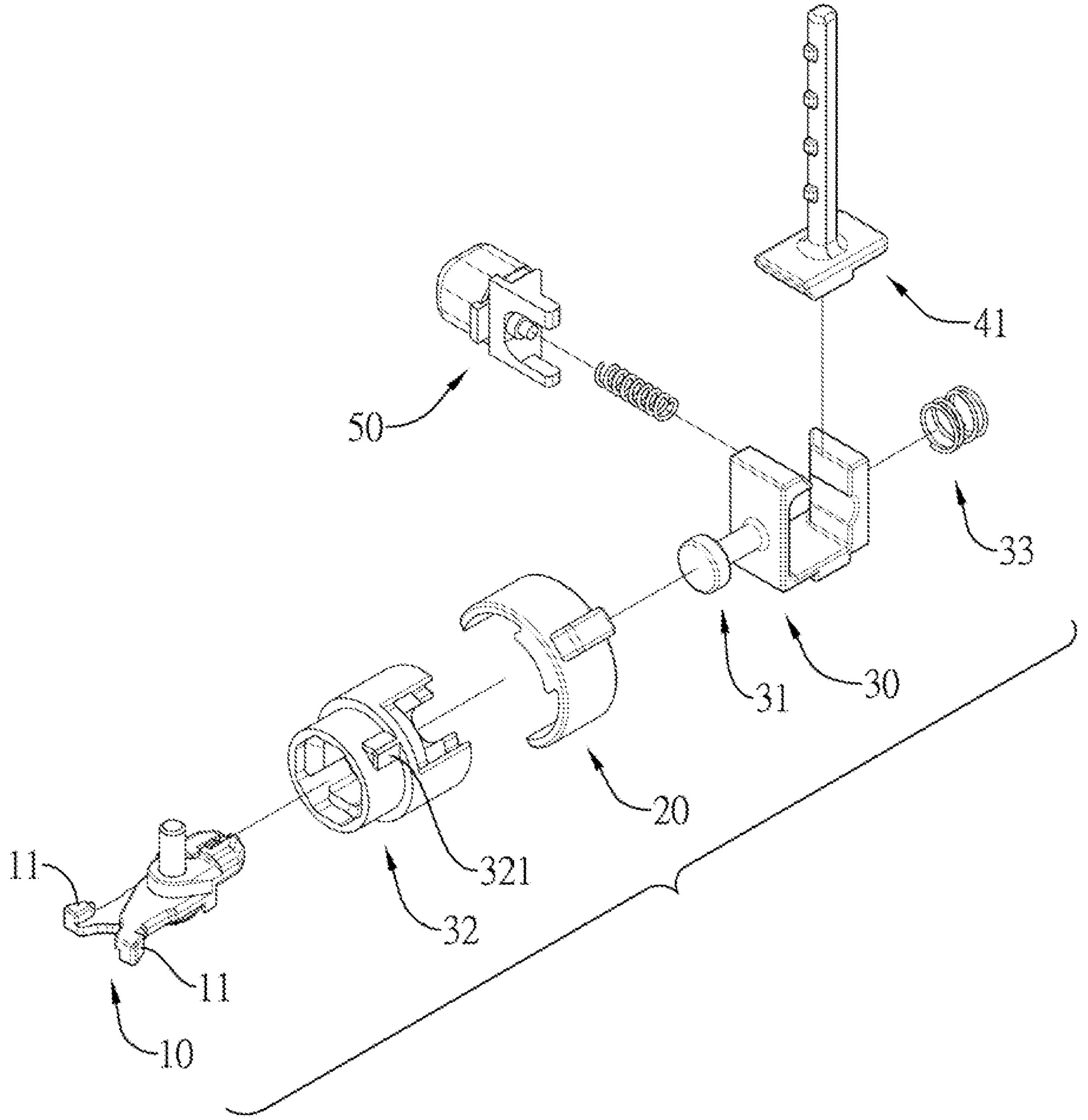
FIGS. 3 and 4 are partial exploded perspective views of the first embodiment of the electronic device locking apparatus in FIG. 1.
Figure 4:
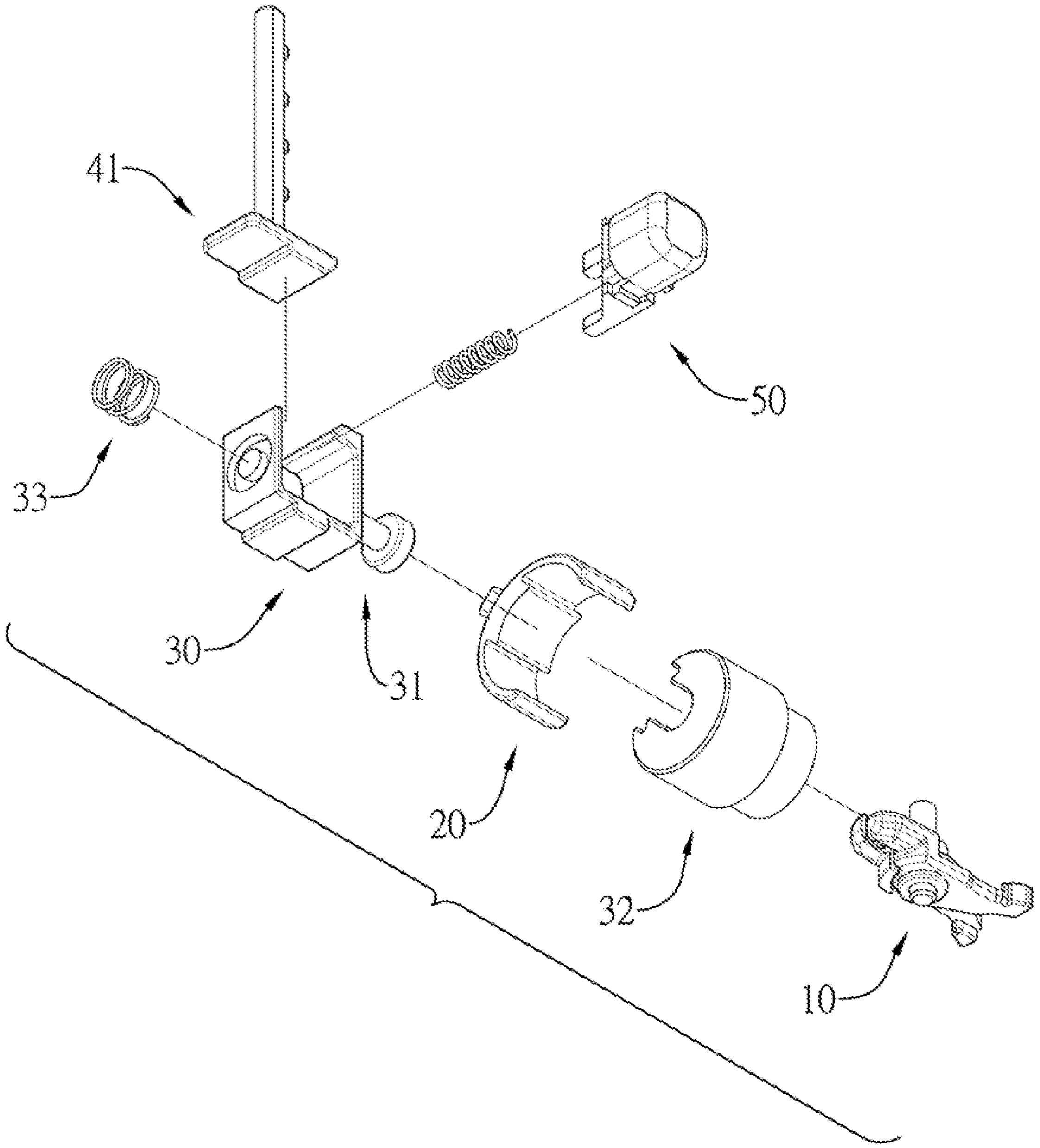

Preferably, with reference to FIGS. 3 and 5, the rotating member 32 is a sleeve and has an opening facing toward the fixing member 10 and mounted around an inner end portion of the fixing member 10. The hook resilient element 12 of the fixing member 10 allows outer ends of the two hooks 11 that are pivotally connected with each other to be folded and inner ends of the two hooks 11 to be unfolded in the normal state. An interior of the rotating member 32 is formed to have different inner diameters, so as to prevent the inner ends of the two hooks 11 from being unfolded. When the rotating member 32 is rotated to the different angles, the interior of different inner diameters forces the inner ends of the two hooks 11 to be folded to different degrees of expansion and the outer ends of the two hooks 11 to be unfolded to different degrees of expansion, as shown in FIGS. 5 and 6.

A structure of the rotating member 32 is not limited to the structure as described above. The interior of the rotating member 32 may be cortical or the rotating member 32 may be conical. Thus, different axial positions of the rotating member 32 would decide the degrees of expansion of the two hooks 11.

With reference to FIGS. 3 to 5 and 8, the stage adjusting mechanism 20 is movably and non-rotatably connected to the rotating member 32. An end of the central shaft 31 is rotatably and non-movably connected to the rotating member 32, such that the central shaft 31 is able to drive the rotating member 32 to move along an axial direction. The stage adjusting mechanism 20 and the central shaft 31 drive the rotating member 32 to rotate and move respectively and do not interfere with each other.

Figure 7:
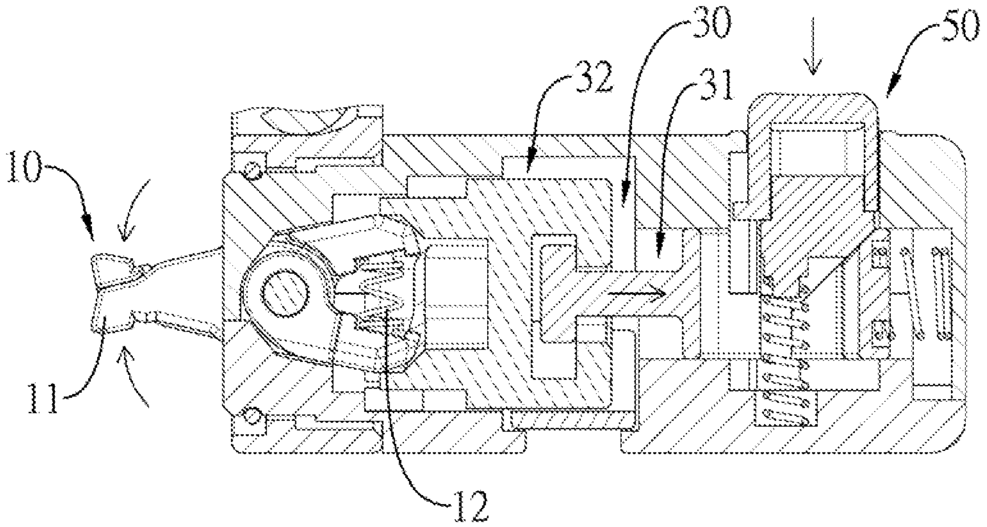

Preferably, the central shaft 31 tends to move toward the fixing member 10. Specifically, the driving mechanism 30 further includes a central shaft resilient element 33 pushing the central shaft 31. In addition, with reference to FIGS. 4, 6, and 7, the electronic device locking apparatus further comprises an unlocking member 50 connected with the central shaft 31 and selectively driving the central shaft 31 to move away from the fixing member 10. The unlocking member 50 is exposed to the outside of the housing 60, so as to allow the user to indirectly pull the central shaft 31. When the central shaft 31 is pulled back, the rotating member 32 also moves away from the fixing member 10. Thus, the inner ends of the two hooks 11 are no longer covered by the rotating remember 32 and are unfolded by the hook resilient element 12. Accordingly, the outer ends of the two hooks 11 are folded as shown in FIG. 7. The fixing member 10 is in the folding state and is able to leave the anti-theft hole.

In the first embodiment, the unlocking member 50 is a button that protrudes outwardly in a normal state. When the unlocking member 50 is pressed, the unlocking member 50 pushes the central shaft 31 to move away from the fixing member 10. Preferably, one of the unlocking member 50 and the central shaft 31 has an inclined surface, such that the unlocking member 50 is able to push the central shaft 31 from different directions.

Figure 8:
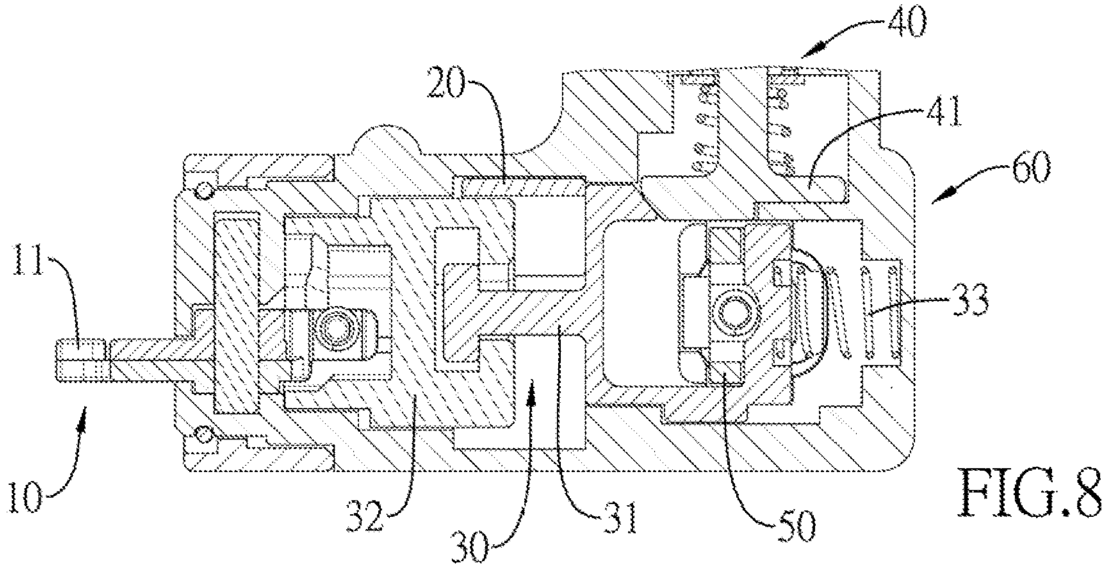
FIGS. 8 and 9 are operational cross-sectional side views of the first embodiment of the electronic device locking apparatus in FIG. 1.
Figure 9:
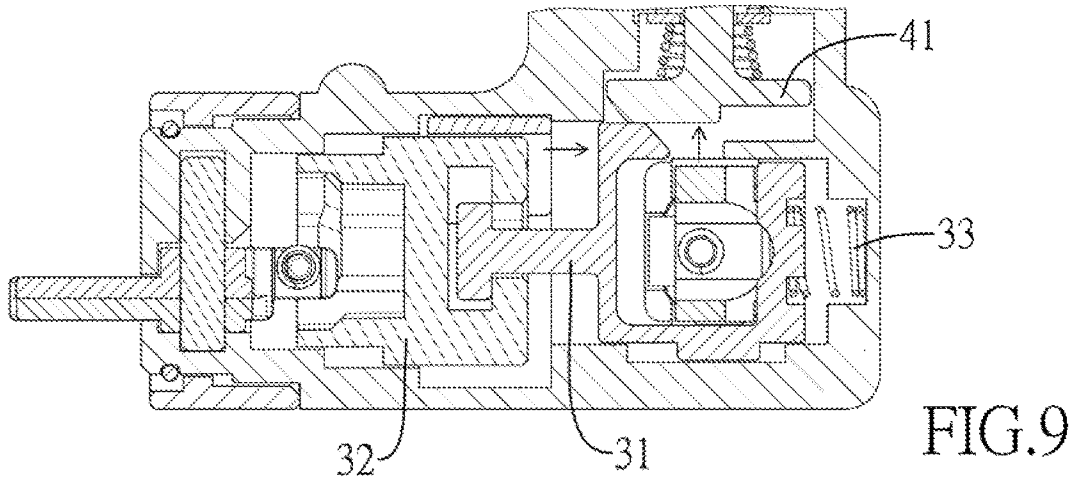

Preferably, with reference to FIGS. 3, 4, 8, and 9, the lock 40 stops the central shaft 31 from moving away from the fixing member 10. That is, the lock 40 stops the fixing member 10 from being switched to the folding state. The lock 40 has an engaging member 41 (such as a locking bar) protruding toward the central shaft 31 in a normal state. When the lock 40 is unlocked, the engaging member 41 is retractable. Thus, the user can pull the central shaft 31 through the unlocking member 50. Moreover, when the central shaft 31 is moved, the central shaft 31 would push the engaging member 41 to retract, as shown in FIG. 9. However, when the lock 40 is locked, the engaging member 41 is unable to retract, so as to prevent the central shaft 31 from moving away from the fixing member 10. Accordingly, the fixing member 10 is unable to be switched to the folding state, as shown in FIG. 8.

Figure 10:
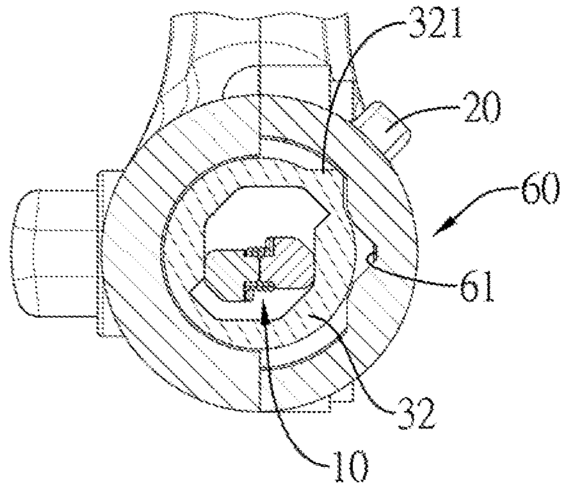
FIG. 10 is a cross-sectional end view of the first embodiment of the electronic device locking apparatus in FIG. 1.

Furthermore, with reference to FIGS. 3, 5, and 10, the rotating member 32 has an engaging portion 321. The engaging portion 321 of the rotating member 32 is formed on an outer side surface of the rotating member 32 and selectively engages with multiple engaging portions 61 that are formed on an inner side surface of the housing 60. Preferably, the engaging portion 321 of the rotating member 32 may be formed as a protrusion and each of the engaging portions 61 of the housing 60 may be formed as a recess. When the central shaft 31 pushes the rotating member 32 to be mounted around the fixing member 10, the engaging portion 321 of the rotating member 32 engages with the engaging portions 61 of the housing 60, as shown in FIG. 10, such that the rotating member 32 is unable to rotate. When the rotating member 32 moves away from fixing member 10, the rotating member 32 disengages from the engaging portions 61 of the housing 60, such that the rotating member 32 is rotatable to switch the working stages. Thus, when the lock 40 is locked, the rotating member is unable to move to disengage from the engaging portions 61 of the housing 60. It can ensure that the fixing member 10 is unable to be switched to other working stages.

By adjusting the working stages (flipping the stage adjusting mechanism 20 to rotate the rotating member 32) and driving the fixing member 10 (the central shaft 31 pushing the rotating member 32 and the unlocking member 50 pulling the rotating member 32 back) separately, the working stages can be adjusted in advance. Then the fixing member 10 is inserted into the anti-theft hole and is unfolded to engage in the anti-theft hole. When unlocking, the fixing member 10 can be folded to leave the anti-theft hole just by pulling the unlocking member 50. Since the working stage is not changed, the fixing member 10 can be used to engage in the other anti-theft bole having the same size. During operation, the unlocking member 50 is pulled to fold the fixing member 10 and then the unlocking member 50 is released after the fixing member 10 is inserted into the anti-theft hole. Afterwards, the central shaft 31 pushes the rotating member 32 again to unfold the fixing member 10. The working stages do not have to be changed, which allows convenient use of the electronic device locking apparatus.

With reference to FIGS. 11 to 18, a second embodiment of the electronic device locking apparatus is shown and is similar to the firs embodiment. The main differences therebetween are as follows.

Figure 12:
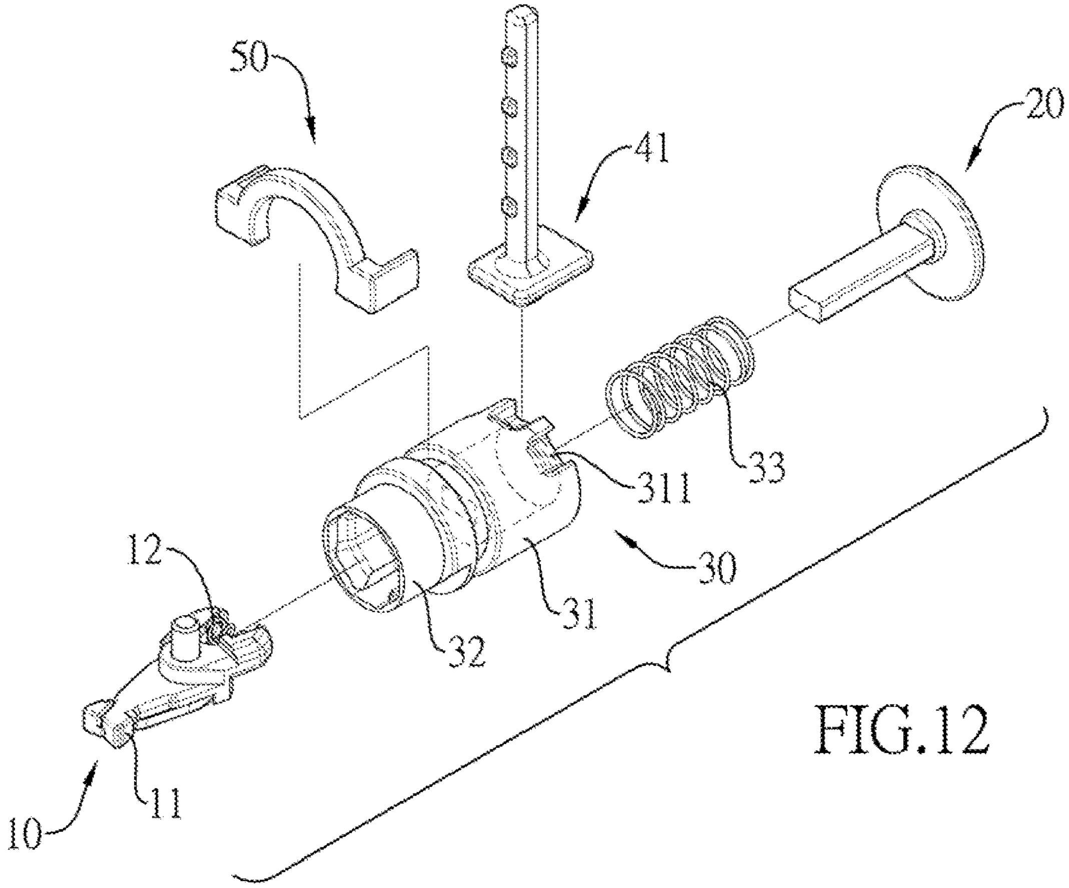
FIGS. 12 and 13 are partial exploded perspective views of the second embodiment of the electronic device locking apparatus in FIG. 11.
Figure 17:
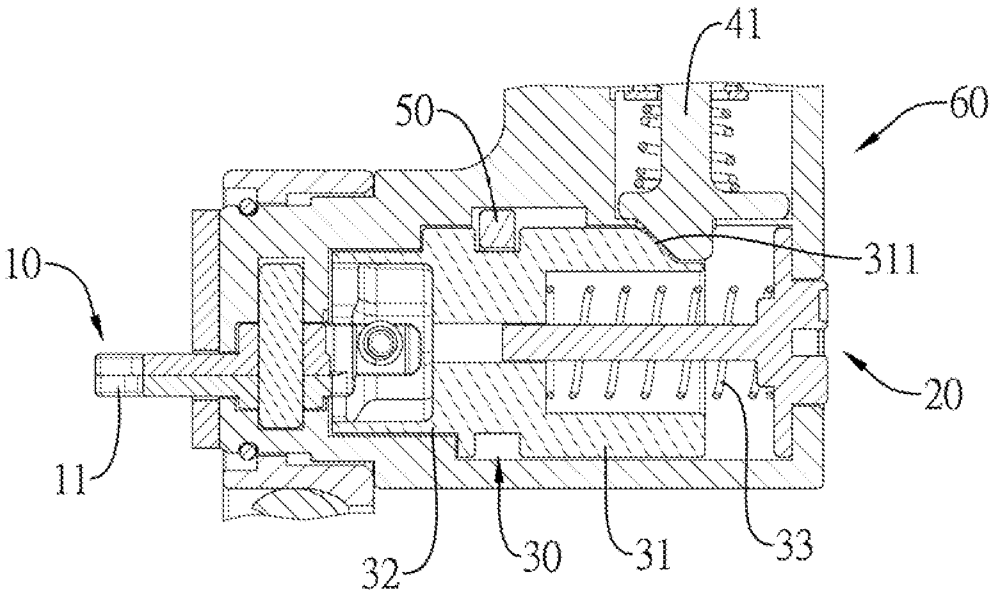
FIGS. 17 and 18 are operational cross-sectional side views of the second embodiment of the electronic device locking apparatus in FIG. 11.
Figure 18:
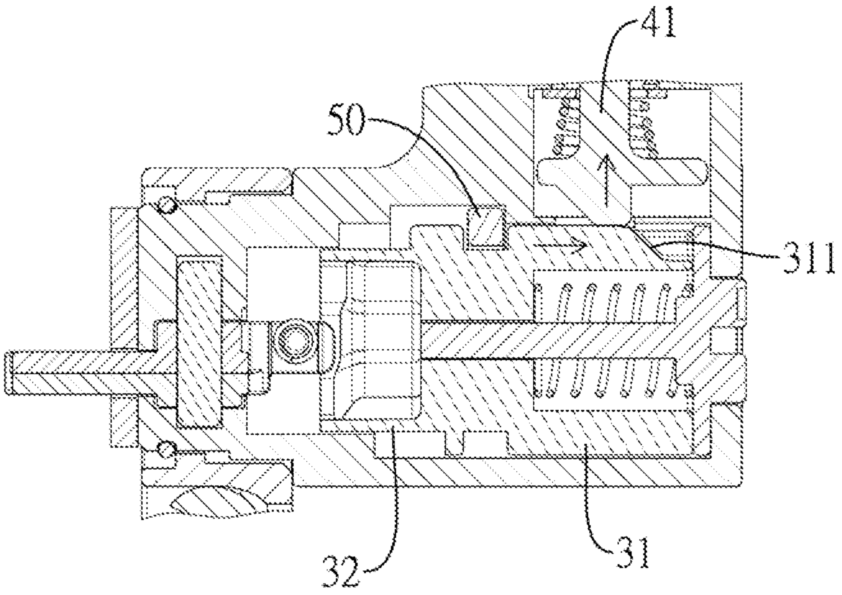
Figure 19:
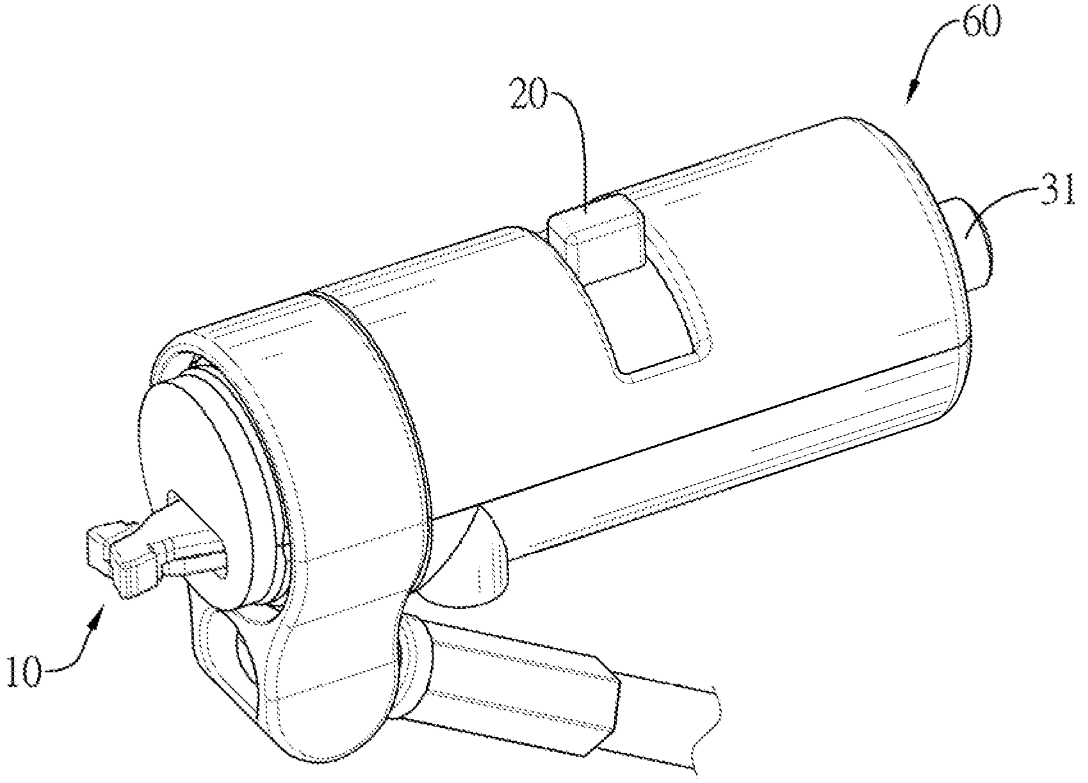
FIG. 19 is a perspective view of a third embodiment of an electronic device locking apparatus in accordance with the present invention.

First, with reference to FIGS. 12 to 14 and 17, the central shaft 31 and the rotating member 32 are fixed together and can be regarded as a single part. Consequently, the central shaft 31 and the rotating member 32 rotate simultaneously. The central shaft 31 has multiple rotating-stopping portions 311 formed on the central shaft 31 and corresponding in position to the engaging member 41 of the lock 40. Each of the rotating-stopping portions 311 of the central shaft 31 is preferably formed as a recess. With reference to FIGS. 12, 17, and 18, when the lock 40 is locked, the engaging member 41 is non-retractable. Except for stopping the central shaft 31 from moving away from the fixing member 10, the engaging member 41 also works along with one of the rotating-stopping portions 311 of the central shaft 31 to stop the central shaft 31 and the rotating member 32 from rotating. Thus, the fixing member 10 is unable to be switched to the other working stages and is unable to be retracted.

Figure 13:
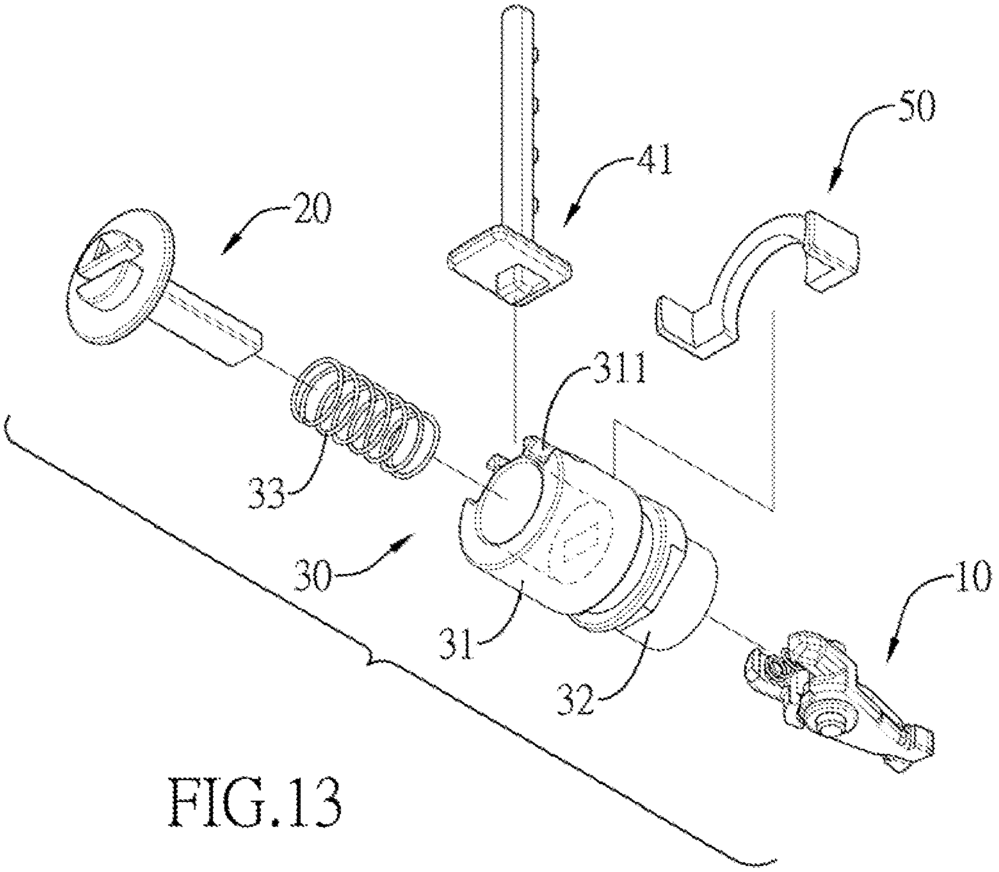
Figure 14:
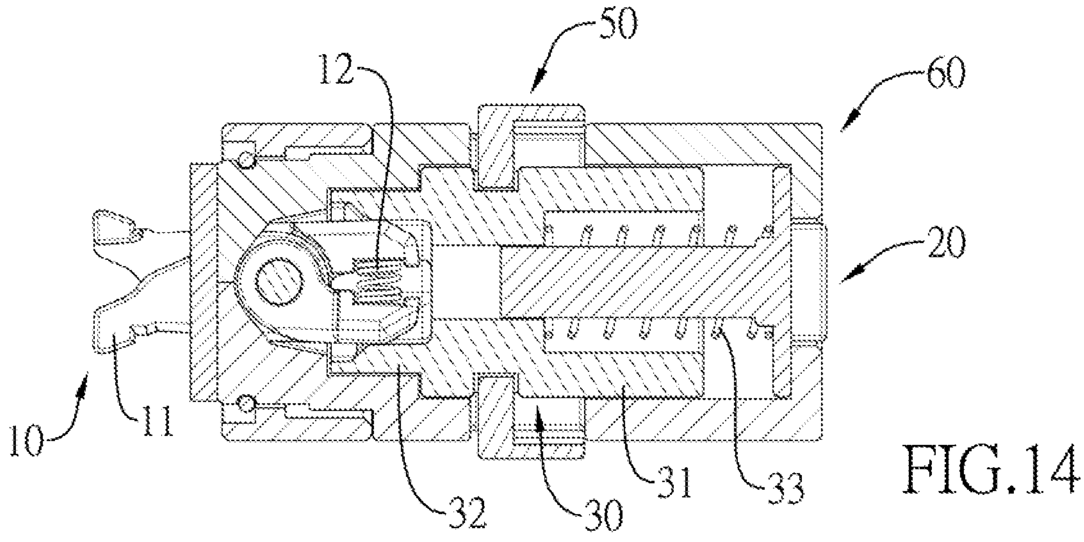
FIGS. 14 to 16 are operational cross-sectional top views of the second embodiment of the electronic device locking apparatus in FIG. 11.

Second, with reference to FIGS. 13, 14, and 17, the stage adjusting mechanism 20 is radially exposed to the outside of the housing 60 from an end of the housing 60 as shown in FIG. 17, so as to allow the user to adjust the working stages. Preferably, it needs a tool, such as a flat-bladed screwdriver, to rotate the stage adjusting mechanism 20 and the stage adjusting mechanism 20 cannot be rotated manually, so as to prevent the working stages from being adjusted easily or accidentally. The stage adjusting mechanism 20 is axially mounted through the central shaft 31 and the rotating member 32 movably but non-rotatably.

Figure 11:
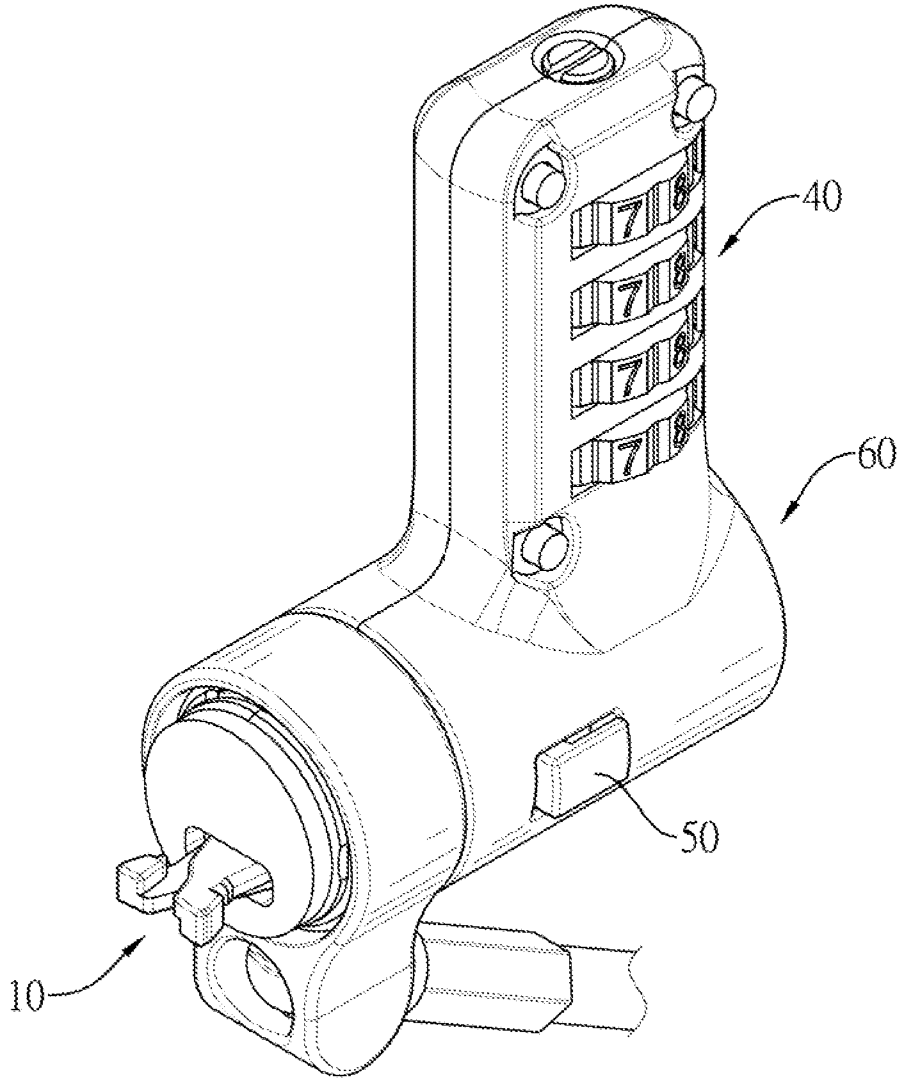
FIG. 11 is a perspective view of a second embodiment of an electronic device locking apparatus in accordance with the present invention.
Figure 15:
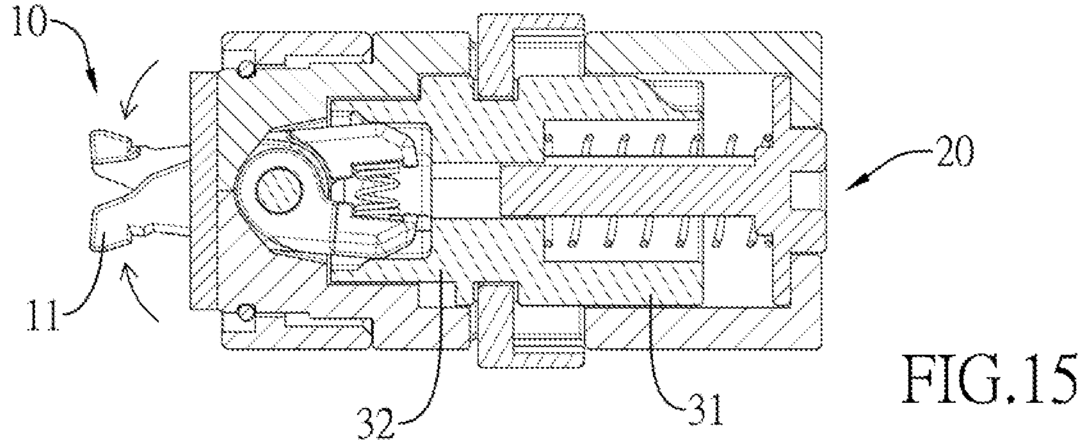
Figure 16:
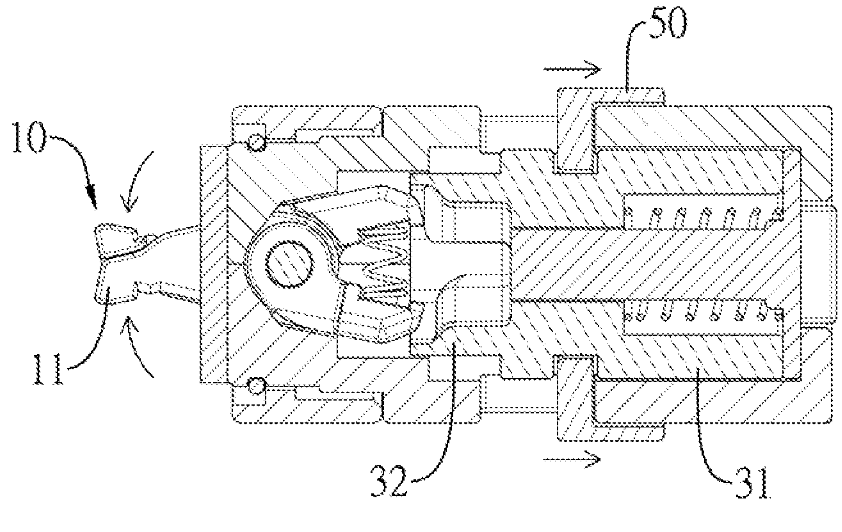

Third, with reference to FIGS. 11, 15, and 16, the button, which is radially protrudes out of the housing 60, of the unlocking member 50 pulls the unlocking member 50 to move away from member 10 when unlocking. Accordingly, the central shaft 31 and the rotating member 32 are moved away from the fixing member 10 simultaneously. In the second embodiment, since the central shaft 31 and the rotating member 32 are formed as a single part, it can be regarded that the unlocking member 50 is connected with the rotating member 32 and drives the rotating member 32 directly.

In the second embodiment, the objective of the present invention can also be achieved b adjusting the working stages (rotating the stage adjusting mechanism 20 with a tool to rotate the central shaft 31 and the rotating member 32) and driving the fixing member 10 (the central shaft 31 pushing the rotating member 32 and pulling the unlocking member 50 to pull the rotating member 32 back) separately.

With reference to FIGS. 19 to 23, a third embodiment of the electronic device locking, apparatus is shown and is similar to the first embodiment. The main differences therebetween are as follows.

Figure 22:
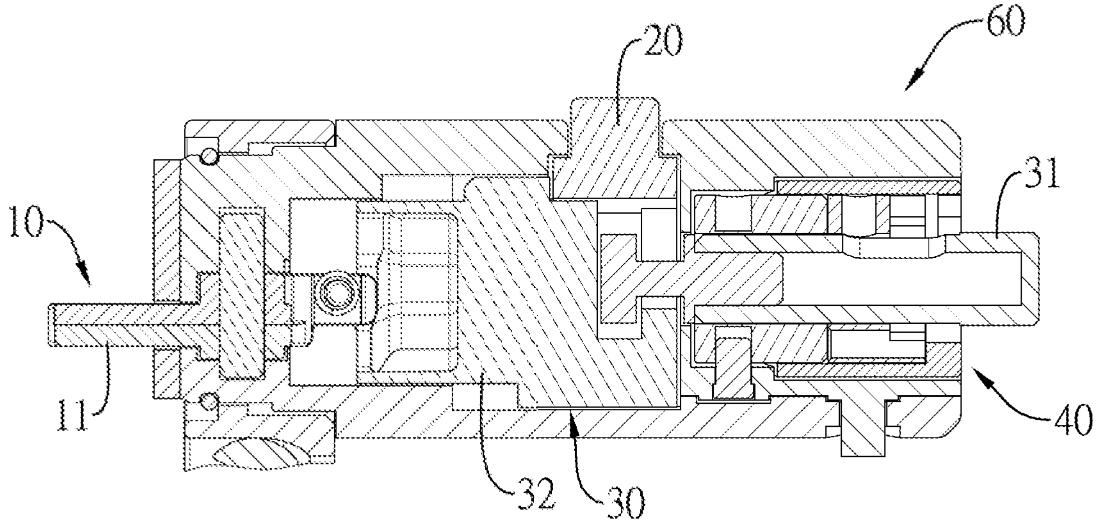
FIGS. 22 and 23 are operational cross-sectional side views of the third embodiment of the electronic device locking apparatus in FIG. 19.
Figure 23:
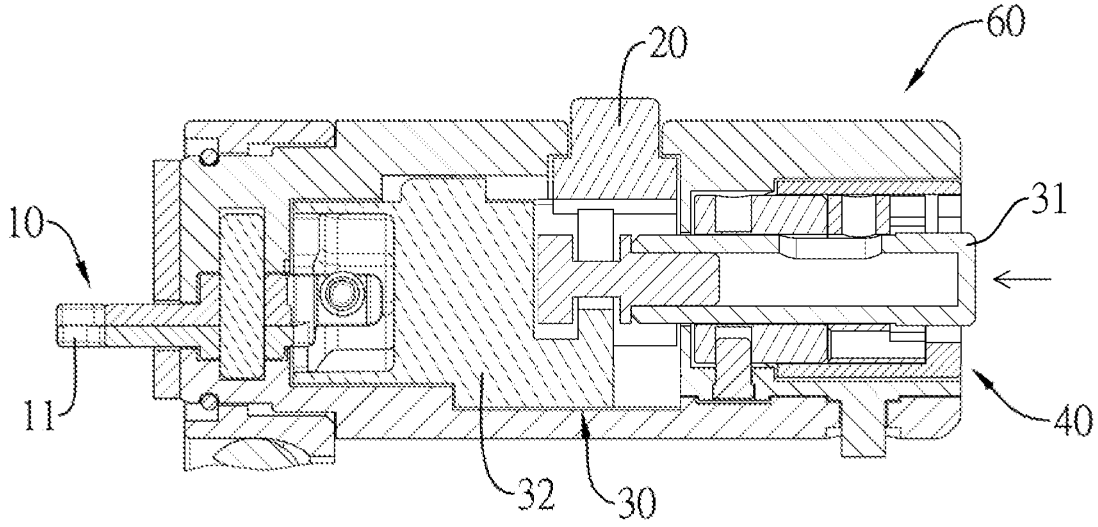

The central shaft 31 in the third embodiment may be regarded as part of the lock 40. The central shaft 31 axially protrudes out of two ends of the lock 40, as shown in FIG. 22. When unlocking, the central shaft 31 is away from the fixing member 10 to protrude out of the lock 40, as shown in FIG. 22. When locking, just directly press the central shaft 31 toward the fixing member 10, then the lock 40 is switched to the locking state following movement of the central shaft 31, and the central shaft 31 is fixed at a position for pushing the rotating member 32 as shown in FIG. 23. When unlocked, such as axially inserting a key into the lock 40 and turning the key, the central shaft 31 rebounds and pulls the rotating member 32 away from the fixing member 10 as shown in FIG. 22. Thus, there is no unlocking member 50 in the third embodiment, the lock 40 performs the unlocking function instead.

Figure 20:
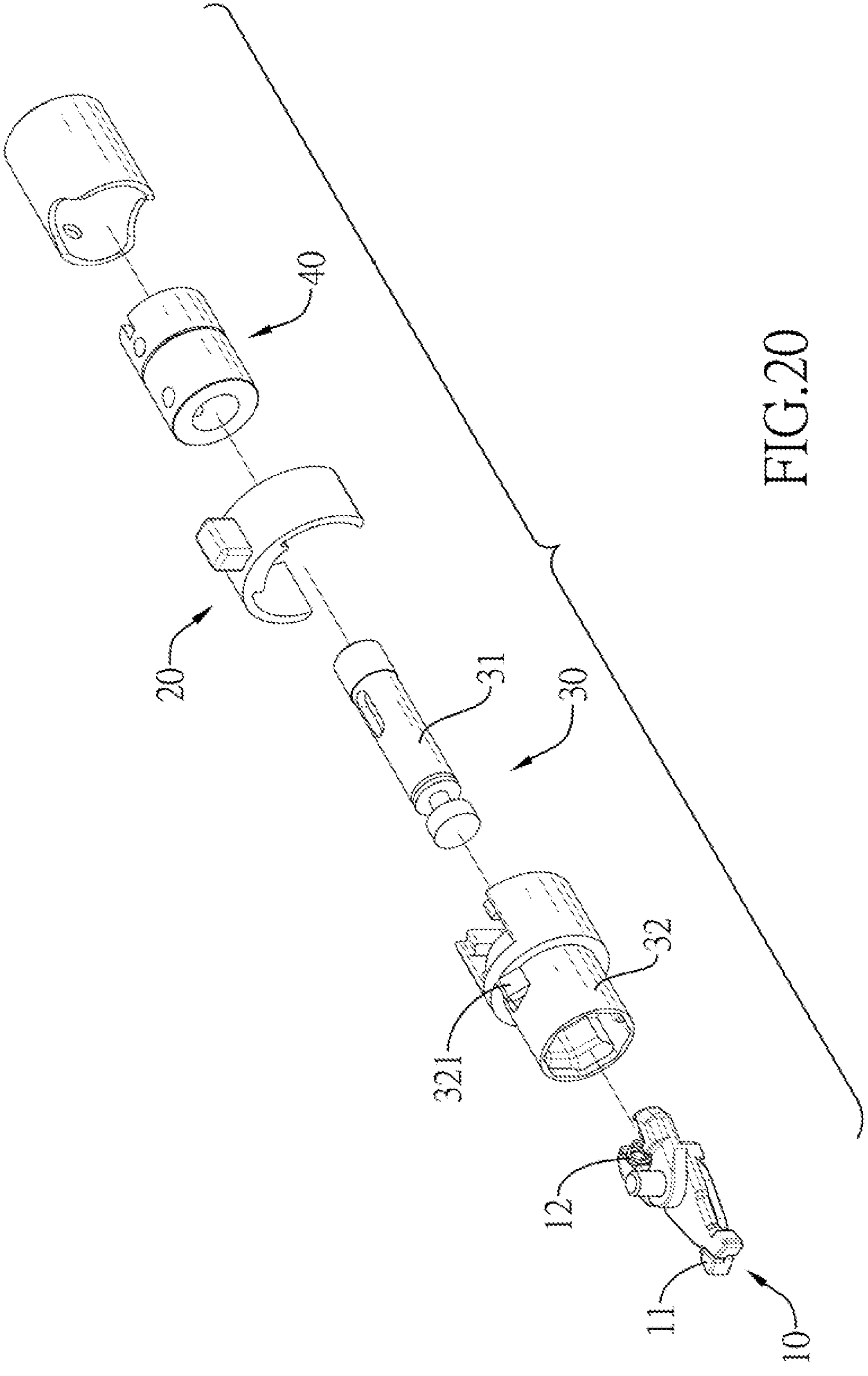
FIGS. 20 and 21 are partial exploded perspective views of the third embodiment of the electronic device locking apparatus in FIG. 19.
Figure 21:
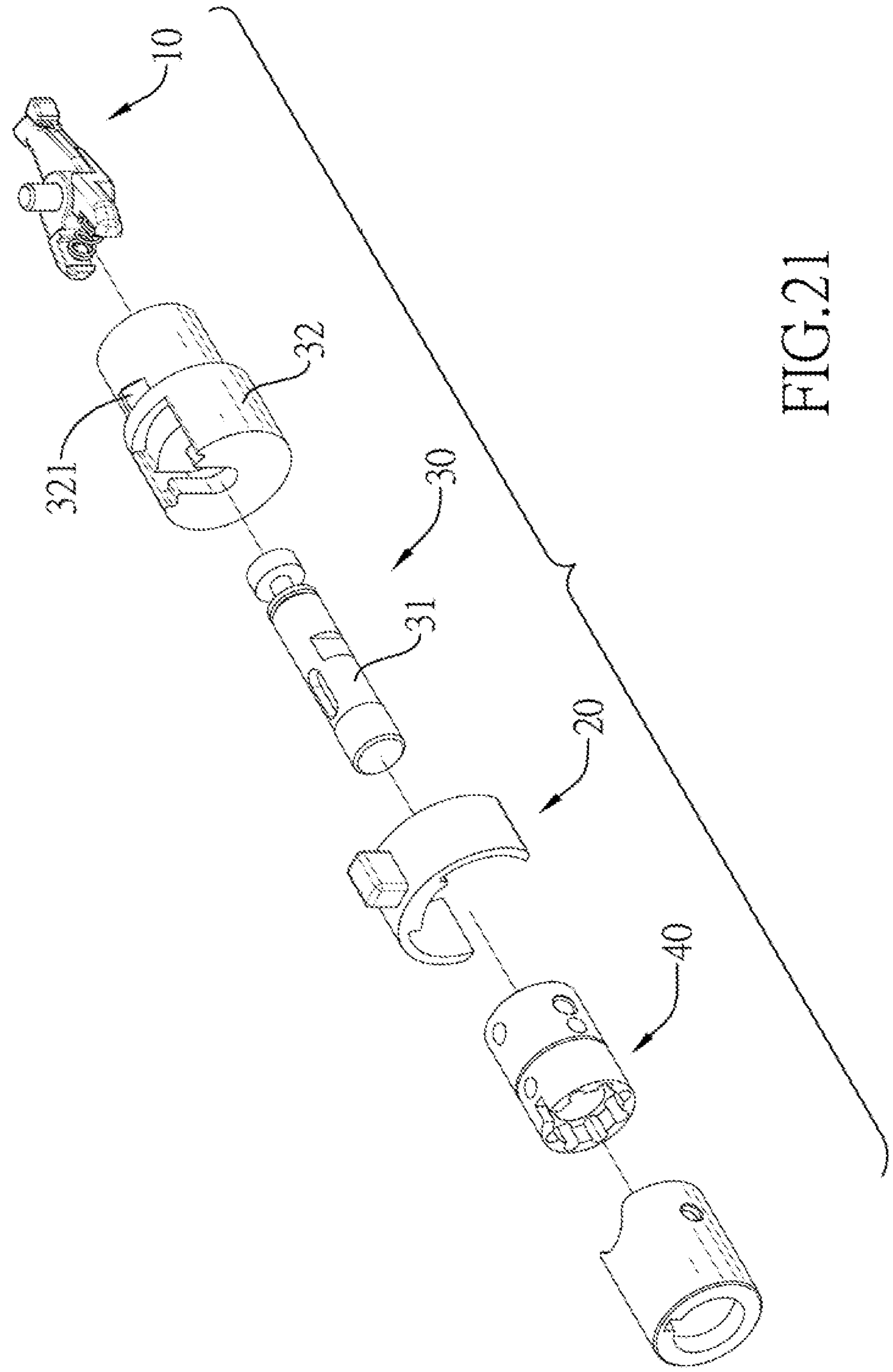

With reference to FIG. 20, in the third embodiment, the engaging portion 321 on the outer side surface of the rotating member 32 and the engaging portions 61 on the inner side surface of the housing 60 are also used to stop the rotating member 32 from rotating. The third embodiment of the electronic device locking apparatus operates in the same way as the first embodiment of the electronic device locking apparatus, and thus a further description of the third embodiment is omitted.

The lock 40 in the first embodiment is a combination lock and the lock in the third embodiment is a key lock.

In the third embodiment, the objective of the present invention also can be achieved by adjusting, the working stages (flipping the stage adjusting mechanism 20 to rotate the rotating member 32) and driving the fixing member 10 (the central shaft 31 pushing the rotating member 32 and the lock 40 to pull the central shaft 31 and the rotating member 32 back) separately.

With reference to FIGS. 24 to 31, a fourth embodiment of the electronic device locking apparatus is shown and is similar to the second embodiment. The main differences therebetween are as follows.

Figure 25:
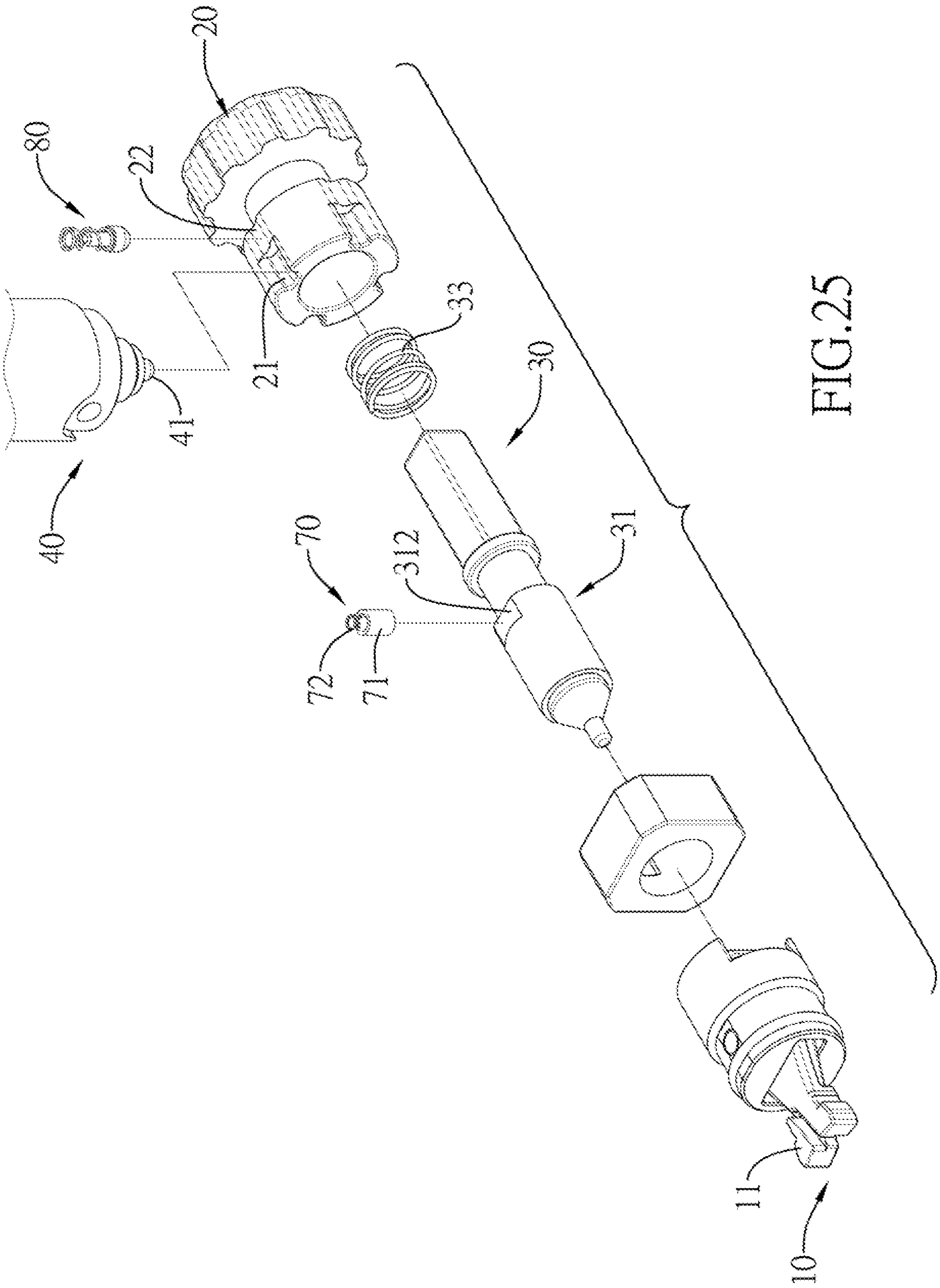
FIGS. 25 and 26 are partial exploded perspective views of the fourth embodiment of the electronic device locking apparatus in FIG. 24.
Figure 26:
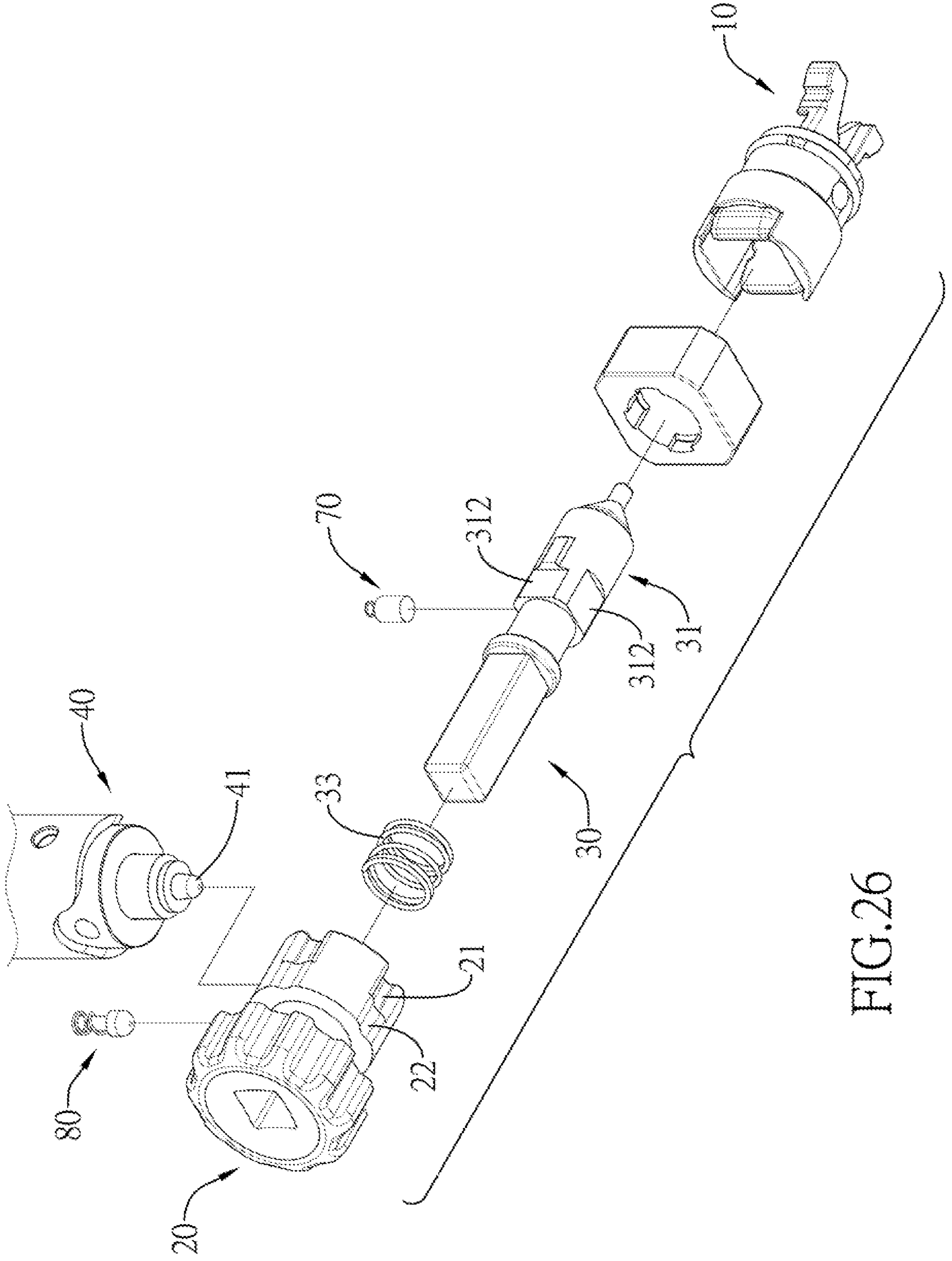
Figure 27:
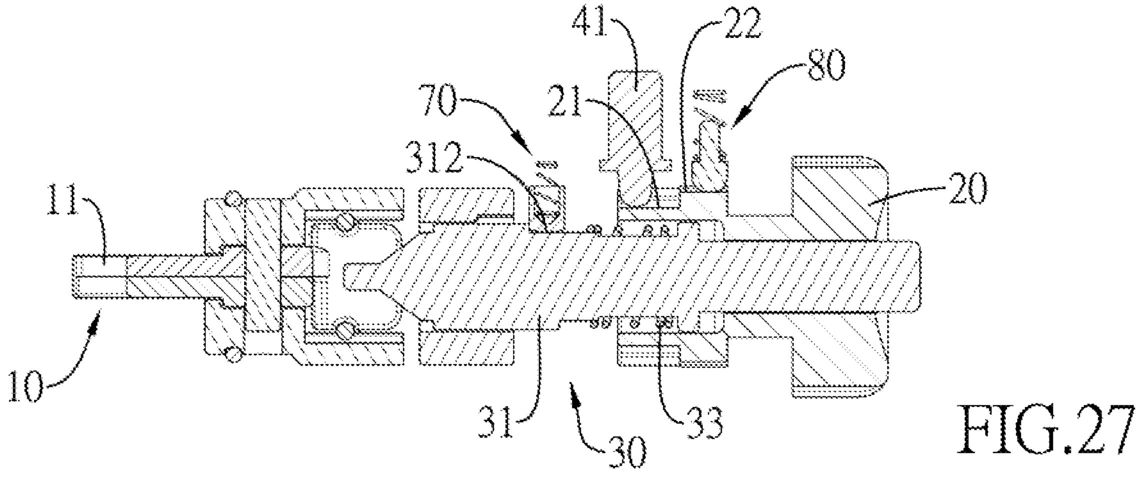
FIGS. 27 to 29 are operational cross-sectional side views of the fourth embodiment of the electronic device locking apparatus in FIG. 24.

With reference to FIGS. 25 to 27, the central shaft 31 in the fourth embodiment tends to move away from the fixing member 10. Specifically, a position and a pushing direction of the central shaft resilient element 33 is changed. The electronic device locking apparatus further comprises a stop member 70 tending to abut against the central shaft 31. When the central shaft 31 moves toward the fixing member 10 to unfold the fixing member 10, the stop member 70 stops the central shaft 31 from moving away from the fixing member 10. Preferably, the stop member 70 includes a pin 71 and a pin resilient element 72. The pin resilient element 72 pushes the pin 71 to abut against the central shaft 31.

Figure 28:
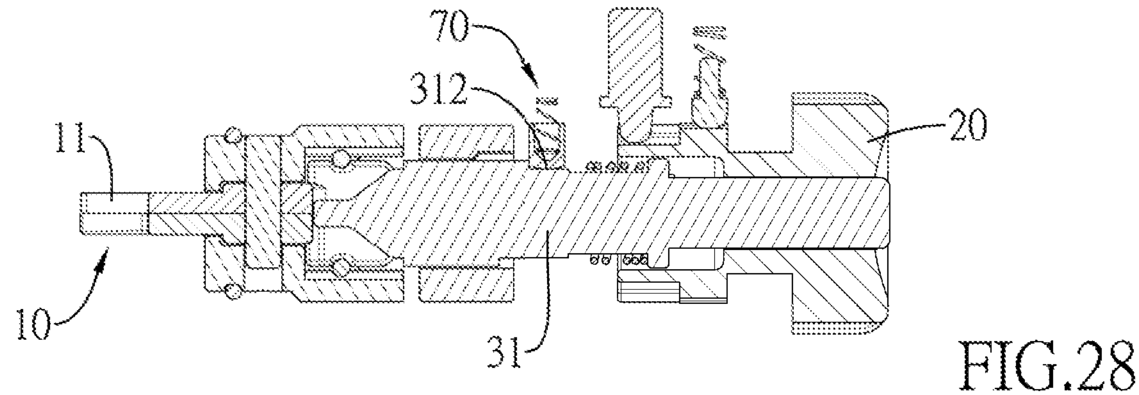
Figure 29:
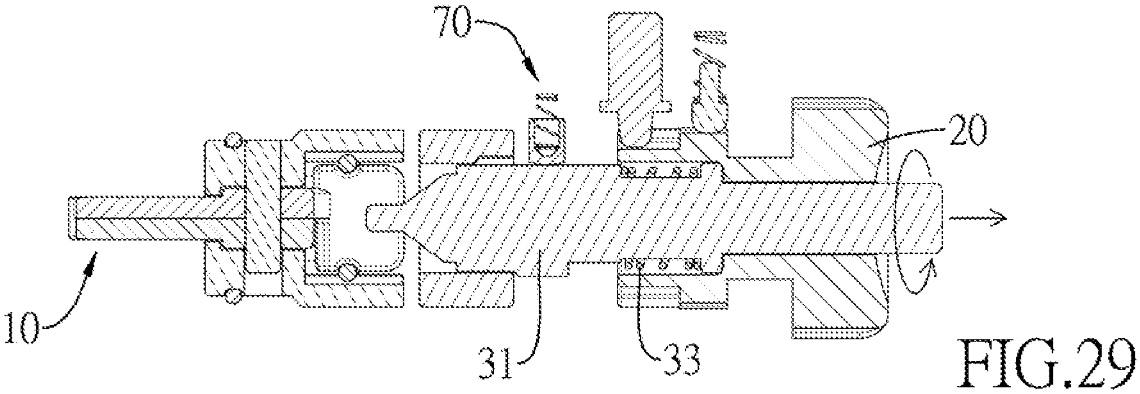
Figure 30:
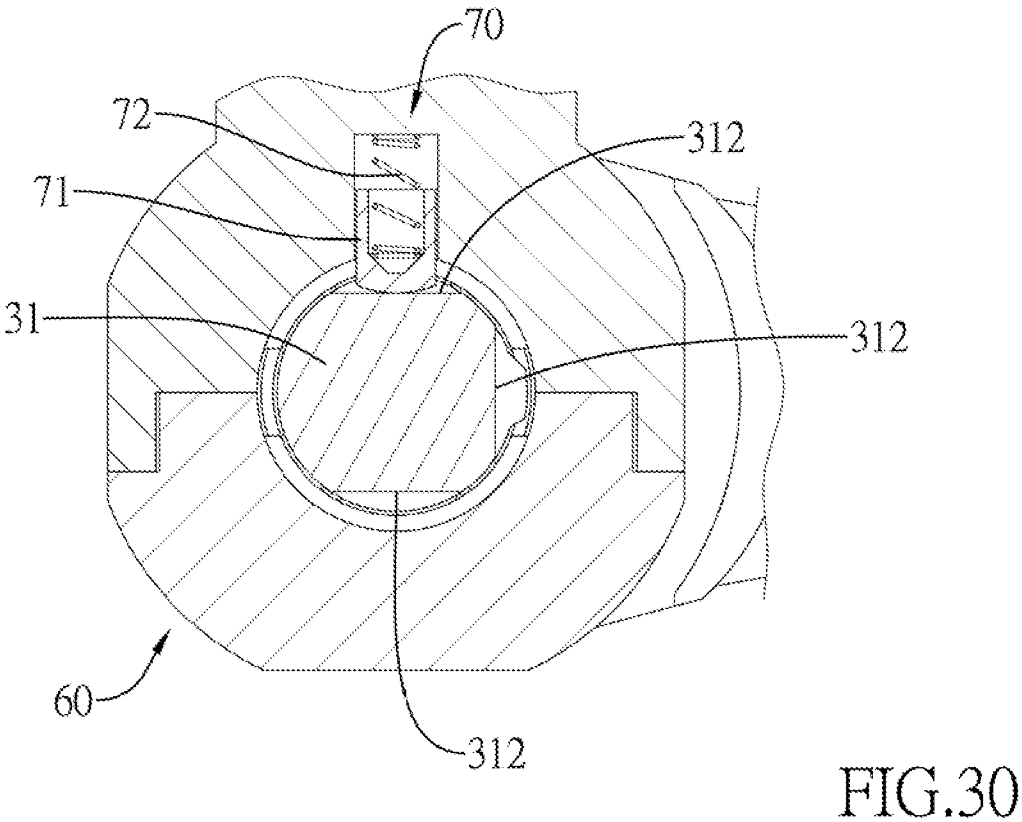
FIGS. 30 and 31 are operational cross-sectional end views of the fourth embodiment of the electronic device locking apparatus in FIG. 24.

The aforementioned configuration is only a different way to control an axial position of the central shaft 31. Therefore, the central shaft 31 having the aforementioned configuration can also be used along with the rotating member 32. However, the central shaft 31 in the fourth embodiment is modified to directly push the fixing member 10 without working with the rotating member 32. In this situation, the hook resilient element of the fixing member 10 drives the two hooks 11 that are pivotally connected with each other to fold the inner ends of the two hooks 11 and to unfold the outer ends of the two hooks 11 in the normal state. With reference to FIGS. 27 and 28, the closer the central shaft 31 to the inner ends of the two hooks 11, the more open the inner ends of the two hooks 11 is and the more open the outer ends of the two hooks 11 is.

Furthermore, with reference to FIGS. 25 to 28, the stage adjusting mechanism 20 rotates the central shaft 31 when adjusting the working stages. When the central shaft 31 moves toward the fixing member 10 to unfold the fixing member 10, the stop member 70 stops the central shaft 31 at different axial positions according to different angles of the central shaft 31. Preferably, the central shaft 31 has multiple stop recesses 312 formed on an outer side surface of the central shaft 31 and arranged at different angular positions. Each of the stop recesses 312 extends toward the fixing member 10 and the stop recesses 312 have different extended depths. That is, axial distances between each of the stop recesses 312 and the fixing member 10 are different. Thus, when the central shaft 31 is pushed to move toward the fixing member 10 (preferably, the user pushes the end, which protrudes out from the stage adjusting mechanism 20, of the central shaft 31), the stop member 70 moves along the outer side surface of the central shaft 31 and protrudes into one of the stop recesses 312. When force applied to the central shaft 31 stops, the central shaft 31 tends to move away from the fixing member 10 until the stop member 70 abuts against a sidewall defined in a corresponding one of the stop recesses 312 to stop the central shaft 31 from keeping moving away from the fixing member 10. Since the stop recesses 312 has said different extended depths, the stop member 70 can abut against the sidewall defined in a different one of the stop recesses 312 by rotating the central shaft 31. Consequently, the central shaft 31 would stop at said different angular positions.

Figure 31:
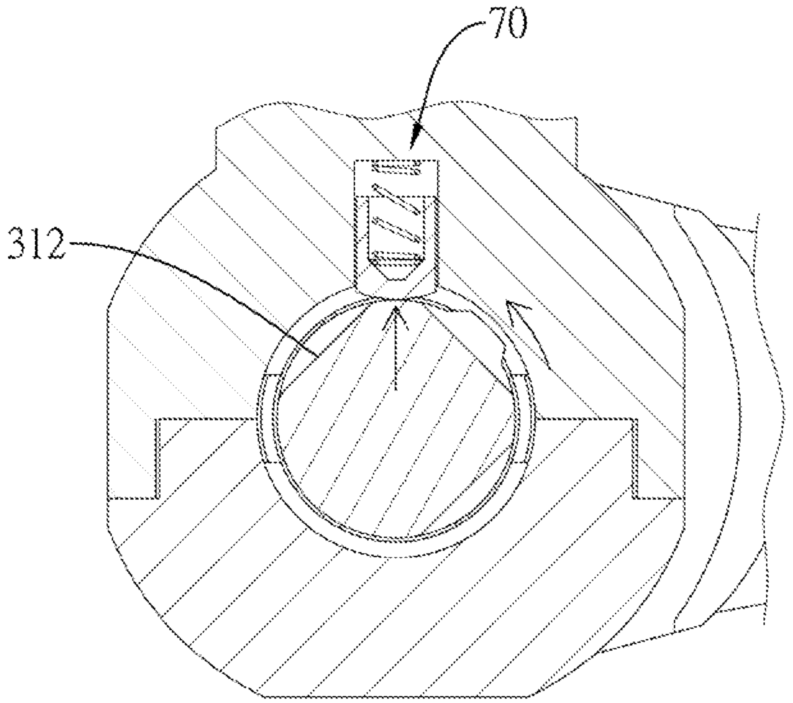

With reference to FIGS. 28 to 31, when unlocking, just slightly rotating the central shaft 31 through the stage adjusting mechanism 20 as shown in FIG. 31 and moving the stop member 70 out of the corresponding one of the stop recesses, the central shaft 31 without support of the stop member 70 continues to move away from the fixing member 10 immediately, so as to restore the fixing member 10 to the folding state. Thus, there is no unlocking member 50 in the fourth embodiment, the stage adjusting mechanism 20, the stop member 70 and the stop recesses 312 perform the unlocking function instead.

In addition the lock 40 in the fourth embodiment is similar to the lock 40 in the second embodiment. The rotating-stopping portions 311 in the second embodiment are formed on the central shaft 31. With reference to FIGS. 25 to 27, the rotating-stopping portions 21, which are preferably formed as recesses, in the fourth embodiment are formed on the stage adjusting mechanism 20 and also corresponds in position to the engaging member 41 of the lock 40. When the lock 40 is locked, the engaging member 41 is non-retractable, such that the engaging member 41 in the stage adjusting mechanism 20 works along with the rotating-stopping portion 21 in the stage adjusting mechanism 20 to stop the stage adjusting mechanism 20 and the central shaft 31 from rotating. Thus, the stop member 70 is unable to leave the corresponding one of the stop recesses 312, and the fixing member 10 is unable to be switched to the other working stages and is unable to be retracted.

Moreover, the electronic device locking apparatus further comprises a positioning member 80 tending to abut against the stage adjusting mechanism 20 (or the central shaft 31), such that the central shaft 31 tends to be positioned at a specific rotating angle. Preferably, the stage adjusting mechanism 20 (or the central shaft 31) has multiple positioning portions 22, each of which is preferably formed as a recess, for working along with the positioning member 80. The positioning member 80 fixes the central shaft 31 to the stop member 70 at multiple angular positions that corresponding in position to the stop recesses 312 respectively, so as to ensure that the stop member 70 can be inserted into the corresponding one of the stop recesses 312. In addition, when unlocking and slightly rotating the central shaft 31, by releasing the central shaft 31, the positioning member 80 also forces the stage adjusting mechanism 20 and the central shaft 31 to rotate back to allow the stop member 70 to face the corresponding one of the stop recesses 312, for ease of use.

Figure 24:
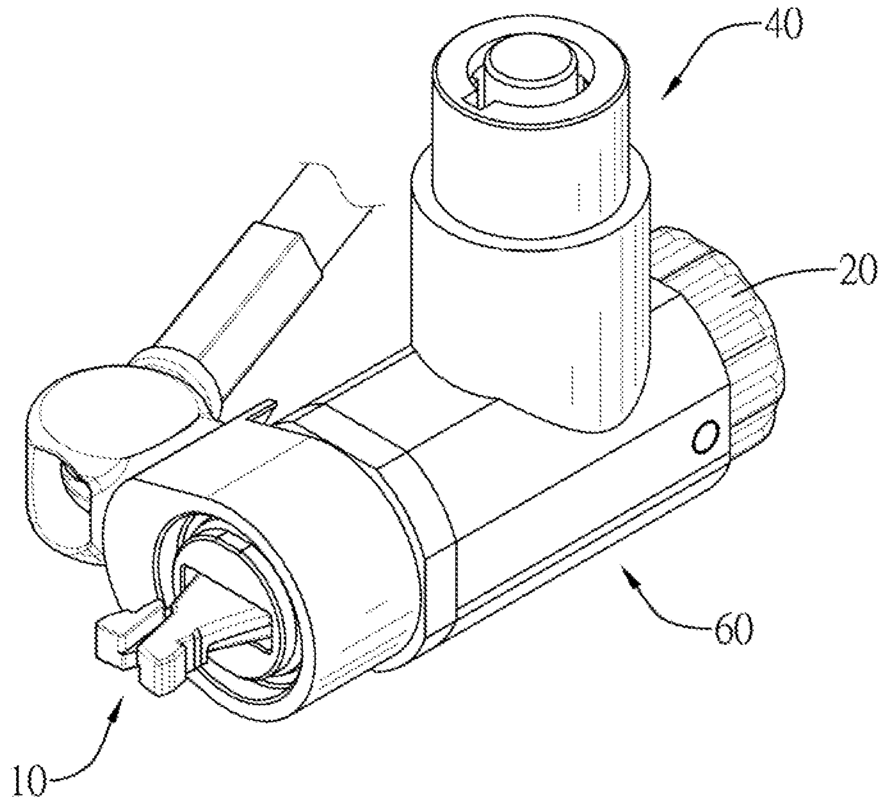
FIG. 24 is a perspective view of a fourth embodiment of an electronic device locking apparatus in accordance with the present invention.

Lastly, with reference to FIGS. 24 and 25, the stage adjusting mechanism 20 is radially exposed to the outside of the housing 60 from the end of the housing 60 like the stage adjusting mechanism 20 in the second embodiment. The difference is that the stage adjusting mechanism 20 in the fourth embodiment is modified to be formed as a turning knob for manually turning.

In the fourth embodiment, the objective of the present invention can be achieved by adjusting the working stages (rotating the central shaft 31 to allow the stop member 70 to corresponding in position to one of the stop recess 312) and driving the fixing member 10 (pushing the central shaft 31 to move the fixing member 10 and slightly rotating the central shaft 31 to allow the central shaft 31 to rebound) separately.

With reference to FIGS. 32 to 39, a fifth embodiment of the electronic device locking apparatus is shown and is similar to the fourth embodiment. The main differences therebetween are as follows.

First, the stage adjusting mechanism 20 rotates the central shaft 31 in both fifth and fourth embodiments. However, in the fourth embodiment, the axial position of the central shaft 31 is controlled by pressing the central shaft 31 and the cooperation of the stop member 70, the stop recesses 312 and the central shaft resilient element 33. With reference to FIGS. 33 to 36, the central shaft 31 in the fifth element is screwed to the unlocking member 50 and the axial position of the central shaft 31 (i.e. the position relative to the unlocking member 50) is changed by rotating the central shaft 31.

Moreover, the working stages in the first four embodiments are adjusted in the stepped form (such as three-stage), and in the fifth and six embodiments, the expansion degree of the fixing member 10 are adjusted by changing the axial position of the central shaft 31 through screwing. Therefore, the working stages in the fifth and sixth, embodiments are adjusted in the stepless form.

Figure 32:
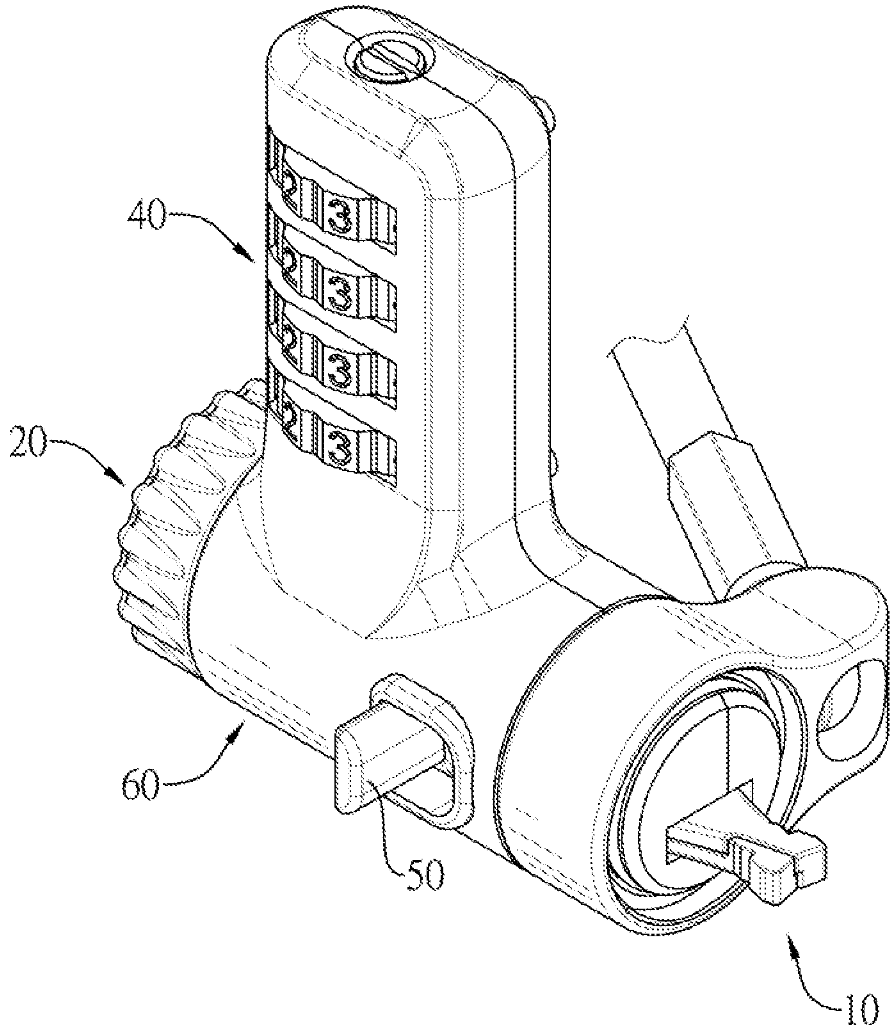
FIG. 32 is a perspective view of a fifth embodiment of an electronic device locking apparatus in accordance with the present invention.

Second, there is no unlocking member 50 in the fourth embodiment and the stage adjusting mechanism 20 is unlocked by slightly rotating the central shaft 31. With reference to FIGS. 33, 34, 36, and 37, with the unlocking member 50 in the fifth embodiment, the unlocking member 20 directly drives (through threads) the central shaft 31 to move away from the fixing member 10 together. By releasing the unlocking member 50, the central shaft resilient element 33 also pushes the central shaft 31 and the unlocking member 50 back. In addition, the unlocking member 50 in the fifth embodiment is radially exposed to the outside of the housing 60 for the user to pull, as shown in FIG. 32.

Figure 33:
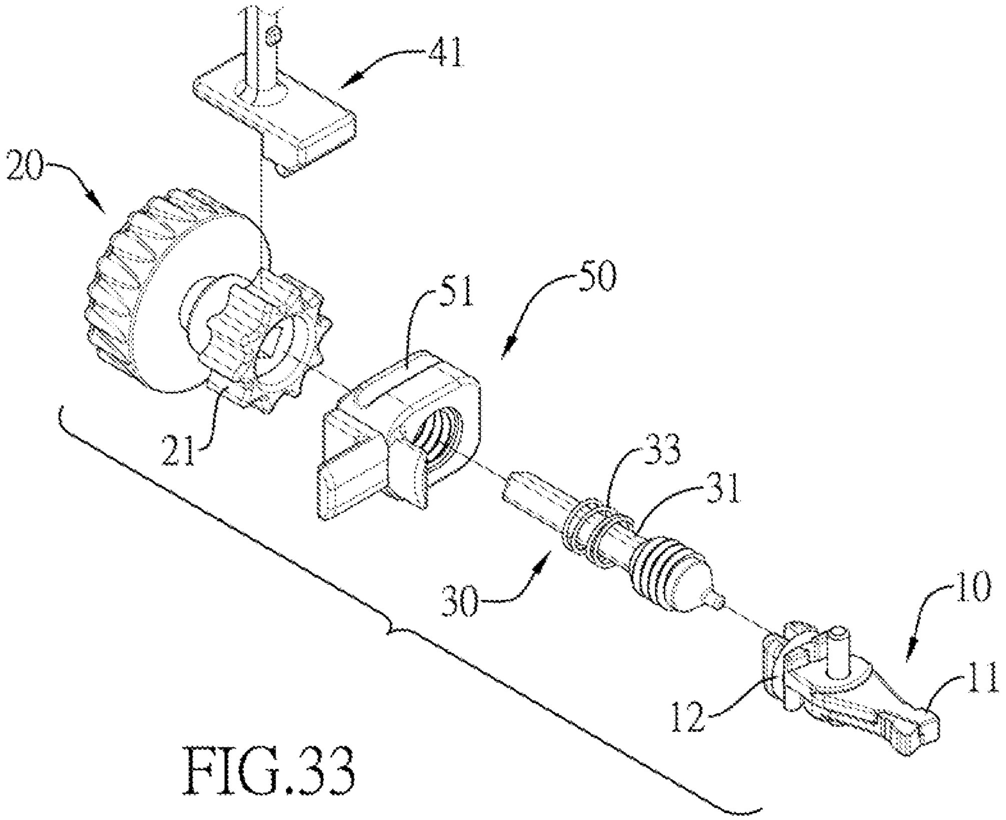
FIGS. 33 and 34 are partial exploded perspective views of the fifth embodiment of the electronic device locking apparatus in FIG. 32.
Figure 34:
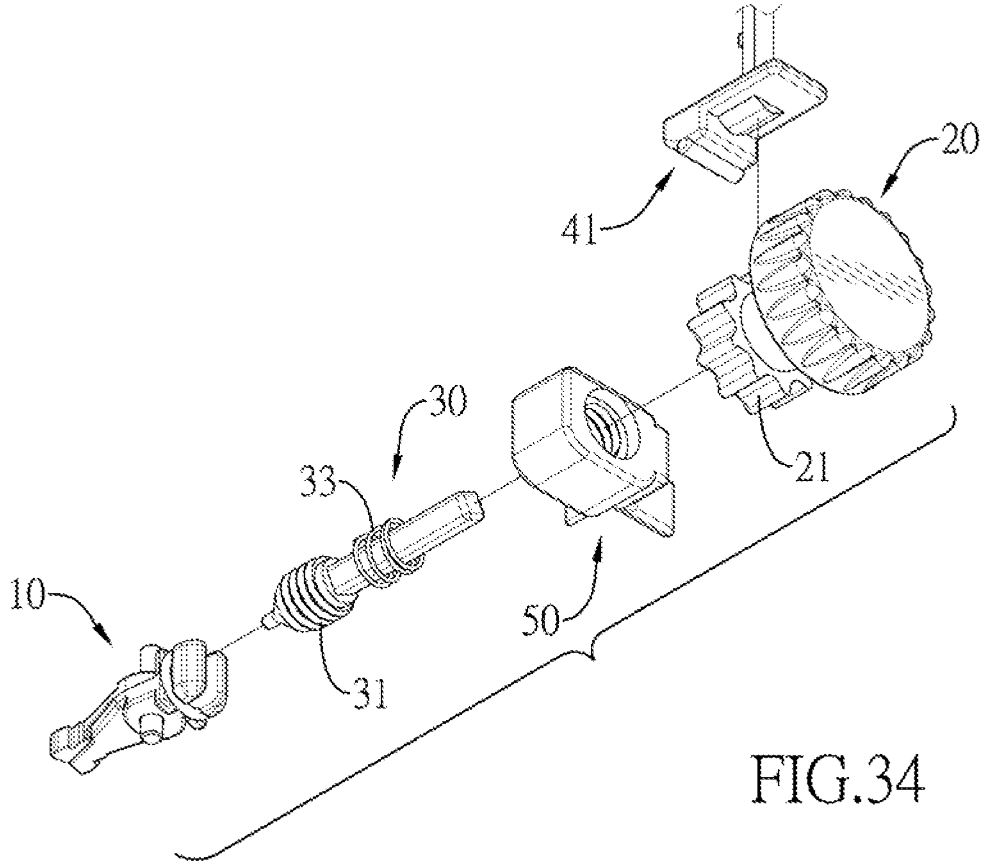
Figure 35:
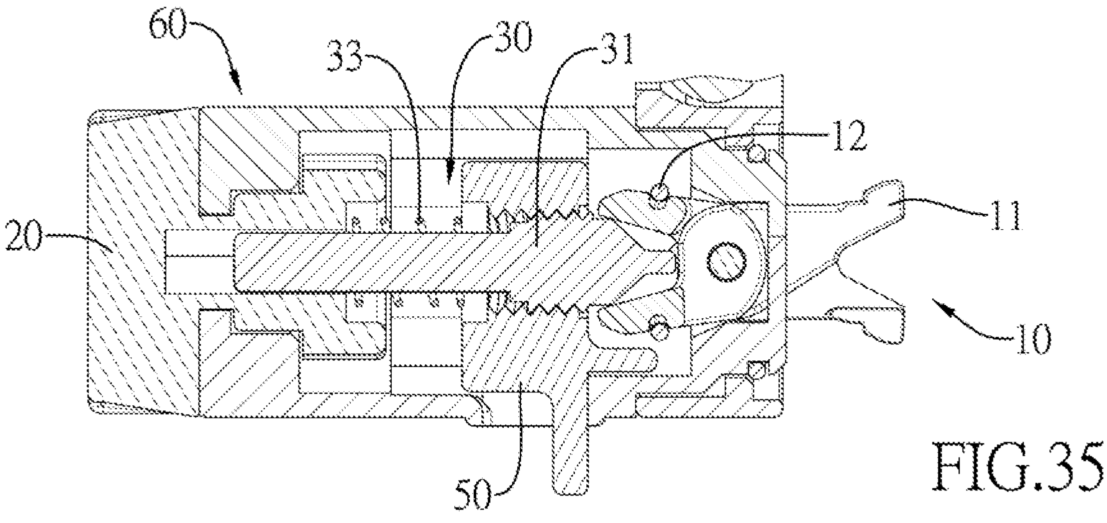
FIGS. 35 to 37 are operational cross-sectional top views of the fifth embodiment of the electronic device locking apparatus in FIG. 32.
Figure 36:
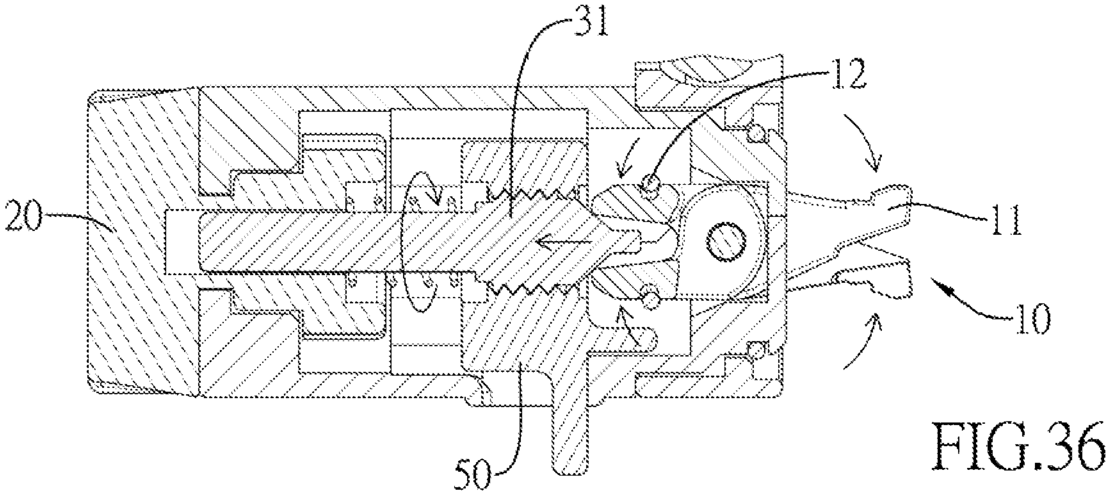
Figure 37:
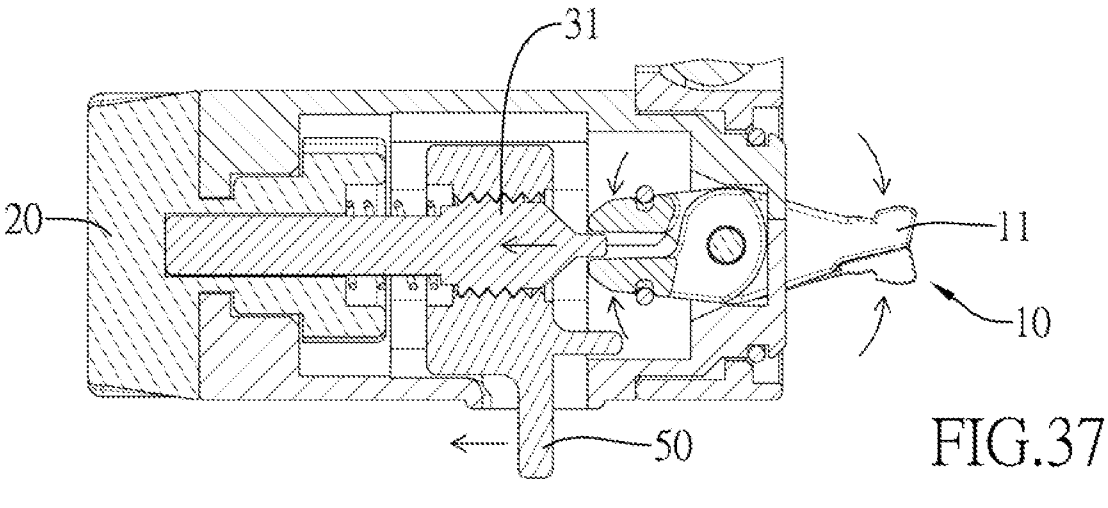
Figure 38:
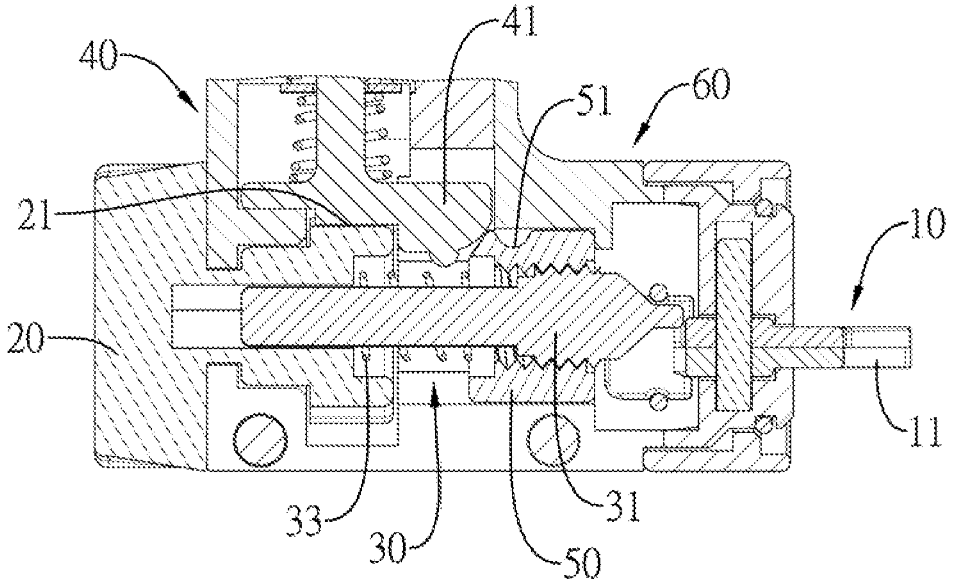
FIGS. 38 and 39 are operational cross-sectional side views of the fifth embodiment of the electronic device locking apparatus in FIG. 32.
Figure 39:
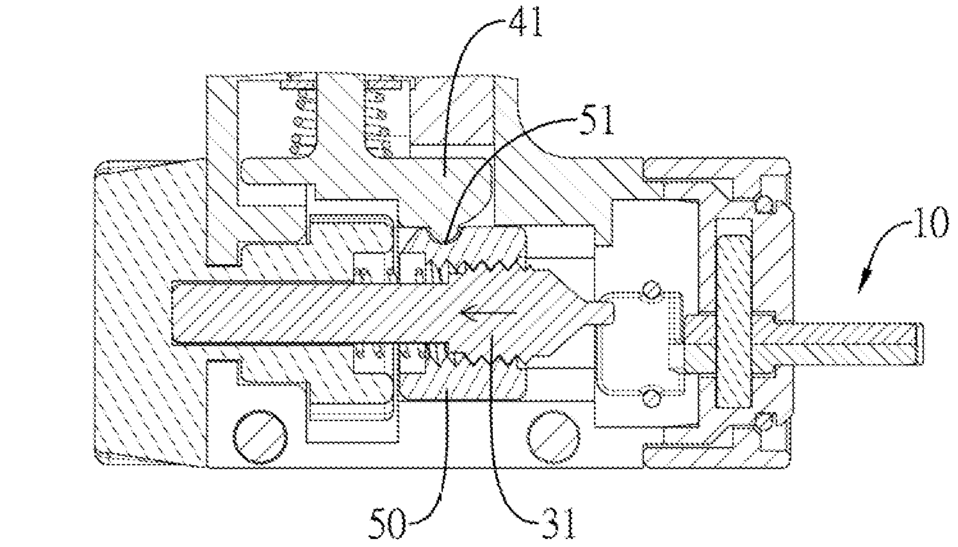
Figure 40:
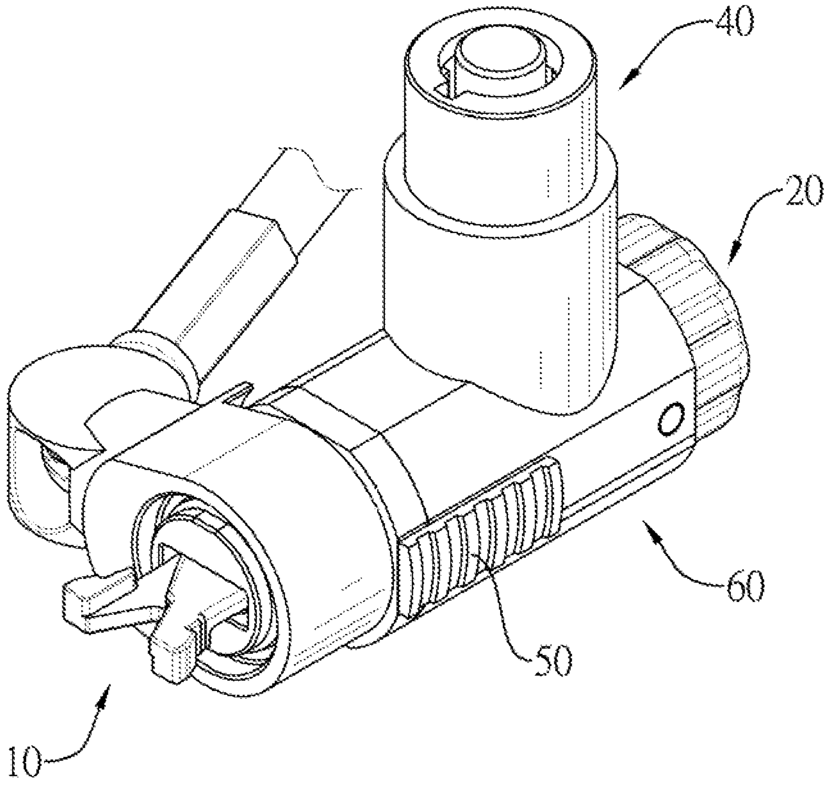
FIG. 40 is a perspective view of a sixth embodiment of an electronic device locking apparatus in accordance with the present invention.
Figure 41:
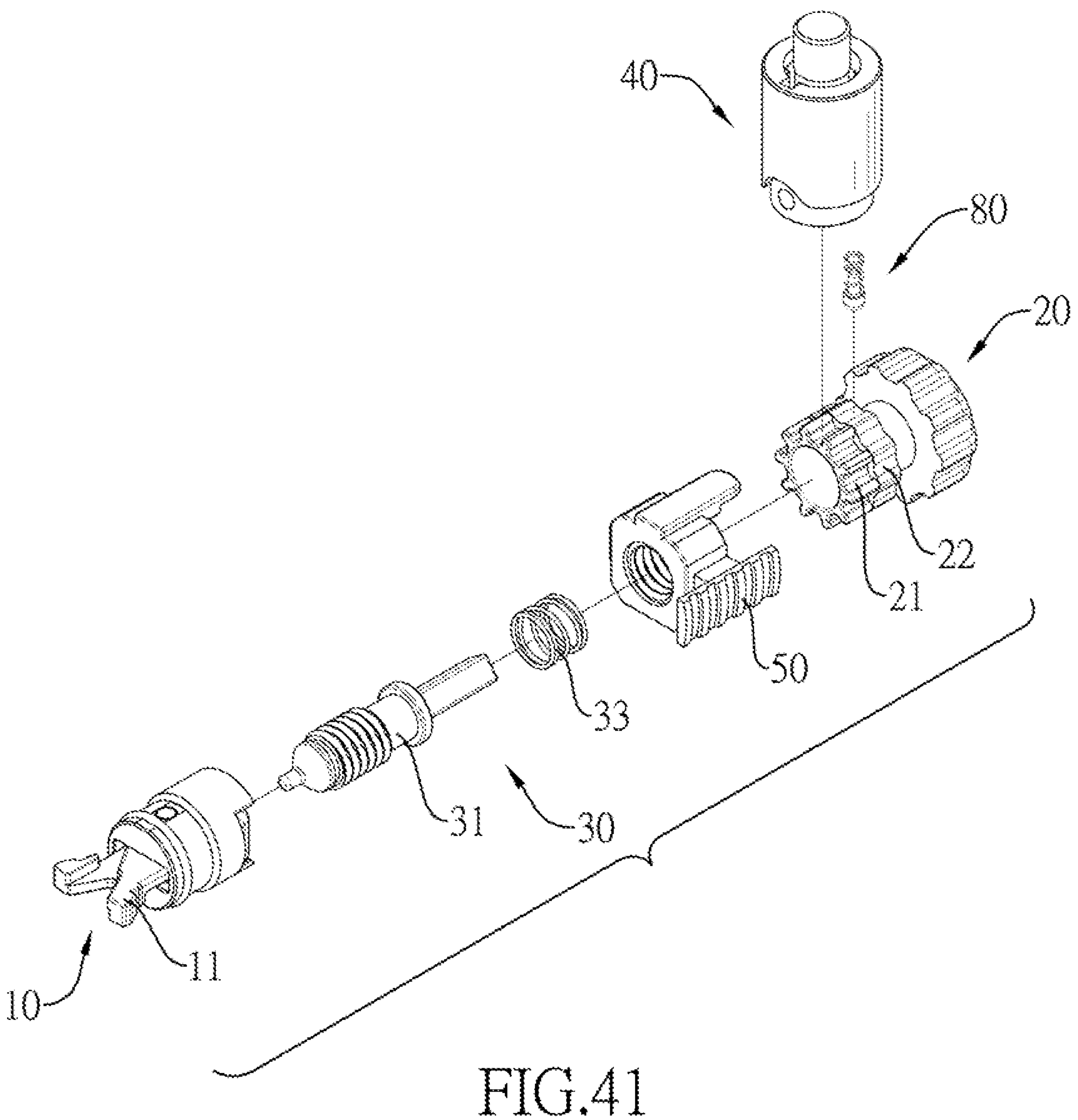
FIGS. 41 and 42 are partial exploded perspective views of the sixth embodiment of the electronic device locking apparatus in FIG. 40.
Figure 42:
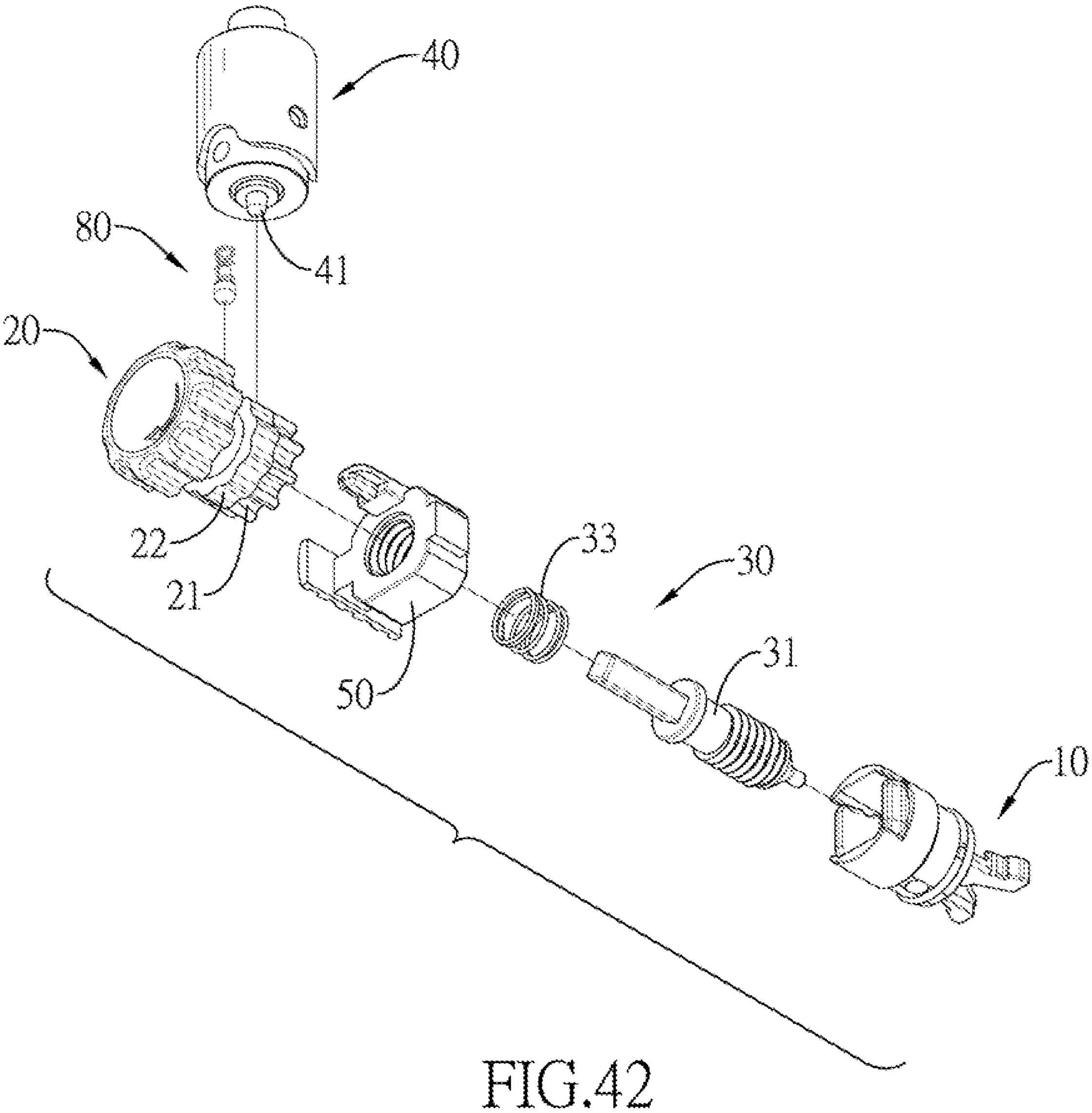
Figure 43:
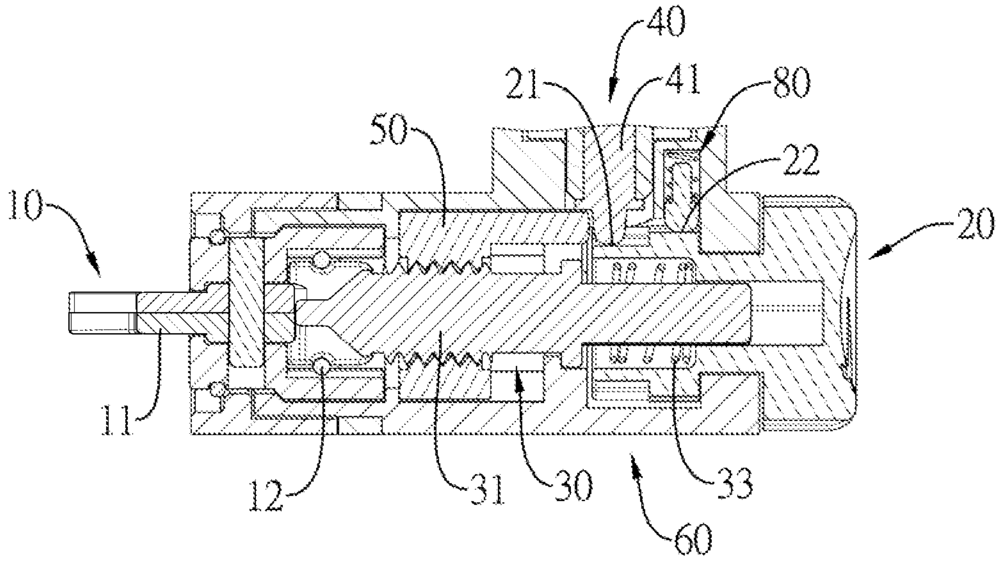
FIGS. 43 and 44 are operational cross-sectional side views of the sixth embodiment of the electronic device locking apparatus in FIG. 40.
Figure 44:
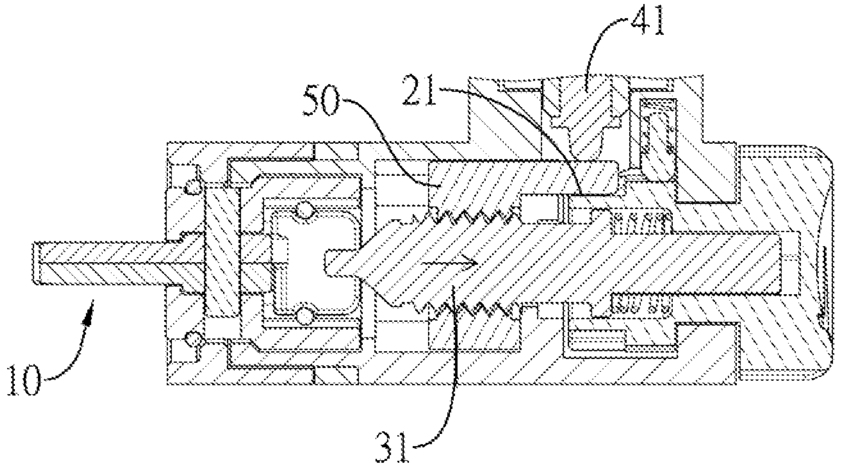

Third, with reference to FIGS. 33, 38, and 39, the lock 40 is similar to the lock 40 in the second embodiment. When the lock 40 is locked, the engaging member 41 is non-retractable. For the time being, part of the engaging member 41 stops the unlocking member (or the central shaft 31) from moving away from the fixing member 10, so as to prevent the unlocking member 50 from driving the central shaft 31 to move away from the fixing member 10. Accordingly, the fixing member 10 is unable to be changed to the folding state. Moreover, the other part of the engaging member 41 works along with the rotating-stopping portion 21 of the stage adjusting mechanism 20 to stop the stage adjusting mechanism 20 and the central shaft 31 from rotating. Accordingly, the central shaft 31 that is connected with the unlocking member 50 through threads is unable to rotate relative to the unlocking member 50. Thus, the central shaft 31 is unable to be moved and the fixing member 10 is unable to be switched to the other working stages. In addition, when the lock 40 is unlocked and the engaging member 41 is retractable, the engaging member 41 and the rotating-stopping portions 21 of the stage adjusting mechanism 20 can function like the positioning member 80 in the fourth embodiment and fix the central shaft 31 at a specific rotating angle. Thus, the working stage that is adjusted in the stepless form in the fifth embodiment can also be adjusted in the stepped from.

Furthermore, preferably, in an unlocking state, when the central shaft 31 is pulled back by the unlocking member 50 to a certain extent, the engaging member 41 engages in a back engaging recess 51 of the unlocking member 50. For the time being, if the lock 40 is switched to the locking state and the engaging member 41 is unable to be retracted, the central shaft 31 and the unlocking member 50 would stay at the position that is away from the fixing member 10 and the fixing member 10 would remain folded.

In the fifth embodiment, the objective of the present invention can be achieved by adjusting the working stages (rotating the central shaft 31 to change the position of the central shaft 31) and driving the fixing member 10 (the central shaft 31 pushing the fixing member 10 and the unlocking member 50 to pull the central shaft 31 back) separately.

With reference to FIGS. 40 to 44, the sixth embodiment of the electronic device locking apparatus is shown and is similar to the fifth embodiment. The main differences therebetween are as follows.

First, the lock 40 in the fifth embodiment is a combination lock and the lock 40 in the six embodiment is a key lock.

Second, in the fifth embodiment, the engaging member 41 stops the unlocking member 50 (or the central shaft 31) from moving away from the fixing member 10 and stops the stage adjusting mechanism 20 (or the central shaft 31) from rotating with two different parts of the engaging member 41. However, in the sixth embodiment, with reference to FIGS. 42 to 44, the engaging member 41 of the lock 40 stops the unlocking member 50 (or the central shaft 31) from moving away from the fixing member 10 and stops the stage adjusting mechanism 20 (or the central shaft 31) from rotating with the same part of the lock 40.

Third, in the sixth embodiment, there is the positioning member 80 to fix the angle of the central shaft 31.

Thus, in the sixth embodiment, the objective of the present invention can be achieved by adjusting the working stages (rotating the central shaft 31 to change the position of the central shaft 31) and driving the fixing member 10 (the central shaft 31 pushing the fixing member 10 and the unlocking member 50 pulling the central shaft 31 back) separately.

The electronic device locking apparatus of the present invention is not limited to the aforementioned six embodiments, and the essential elements in the six embodiments are exchangeable. For instance, the combination lock and the key lock are exchangeable.

The locking method for the electronic device of the present invention with the aforementioned six embodiments is described as follows.

At first, the basic concept of the locking method is described along with the third and fourth embodiments. At the beginning, the central shaft 31 has not abutted against or unfolded the fixing member 10, and the working stage is adjusted through the stage adjusting mechanism 20 based on the size of the anti-theft hole (by rotating the rotating member 32 in the third embodiment and by rotating the central shaft 31 in the fourth embodiment). Then the fixing member 10 is inserted into the anti-theft hole. For the time being, the fixing member 10 is still folded. Then the central shaft 31 is pressed to unfold the fixing member 10 according to the selected one of the working stages and the lock 40 is switched to the locking state to fix the fixing member 10. Thus, the fixing member 10 engages in the anti-theft hole and the electronic device locking apparatus and the electronic device are inseparable.

In the other four embodiments, the fixing member 10 is folded through the unlocking member 50 and is inserted into the anti-theft hole. Then the unlocking member is released to unfold the fixing member 10 according to the selected one of the working stages. Lastly, switch the lock 40 to the locking state.

The locking method for the electronic device of the present invention can also have many variations and is described along with the aforementioned six embodiments as follows.

When the fixing member 10 of the electronic device is inserted into the anti-theft hole, by moving the central shaft 31 of the electronic device locking apparatus toward the fixing member 10, the fixing member 10 would engage in the anti-theft hole based on the selected one of the working stages as the six embodiments described above. However, the electronic device locking apparatus and the locking method, of the present invention are not limited to have the central shaft 31. In addition, moving of the central shaft 31 toward the fixing member 10 may be manually operated or automatically driven by an internal structure such as the central shaft resilient element 33.

Furthermore, when the central shaft 31 is moving toward the fixing member 10, the central shaft 31 may directly push the fixing member 10 to unfold the fixing member 10 and the central shaft 31 would be moved to the different axial positions (the different extended depths) according to the selected one of the working stages, as shown in the fourth, fifth and the sixth embodiments. However, it can also be modified to that the central shaft 31 pushes the rotating member 32 and the rotating member 32 pushes the fixing member 10 to unfold the fixing member 10. The rotating member 32 would be rotated to the different angles according to the selected one of the working stages to push the fixing member 10, as shown in the first, second and third embodiments.

In addition, the central shaft 31 may tend to move toward the fixing member 10. However, the fixing member 10 is inserted into the anti-theft hole after the user pushes the central shaft 31 to move away from the fixing member 10 (which is operated through the unlocking member 50 in the first, second, fifth and sixth embodiments). Then the central shaft 31 is released (by releasing the unlocking member 50 in the first, second, fifth, and sixth embodiment) to allow the central shaft 31 to move toward the fixing member 10, such that the fixing member 10 can be unfolded according to the selected one of the working stages and engages in the anti-theft hole.

However, in the other embodiments, the central shaft 31 is also possible not to move toward the fixing member 10. The central shaft 31 is moved toward, the fixing remember 10 (by pressing the central shaft 31 in the third and fourth embodiments) after the fixing member 10 is inserted into the anti-theft bole, such that the fixing member 10 can be unfolded according to the selected one of the working stages and engages in the anti-theft hole.

Furthermore, the central shaft 31 may also tend w move away the fixing member 10. When the user moves the central shaft 31 toward the fixing member 10, the stop member 70 stops the central shaft 31 from moving away from the fixing member 10, so as to fix the central shaft 31 at a specific axial position, as shown in the fourth embodiment. In addition, the lock 40 in the third embodiment may also be regarded as having the stop member 70 to stop the central shaft 31 from moving away from the fixing member 10.

At last, when there is the stop member 70, the working stage is adjusted by rotating the central shaft 31 When the user moves the central shaft 31 toward the fixing member 10, the stop member 70 stops the central shaft 31 at the different axial positions according the different angles of the central shaft 31, like the stop recesses 312 that are disposed at different angular positions as shown in the fourth embodiment.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A locking method for an electronic device, the locking method comprising:

(a) adjusting working stages of an electronic device locking apparatus according to a size of an anti-theft hole of an electronic device;

(b) inserting a fixing member of the electronic device locking apparatus into the anti-theft hole of the electronic device; and (c) switching a lock of the electronic device locking apparatus to a locking state, so as to fix the fixing member of the electronic device locking apparatus to engage in the anti-theft hole of the electronic device with a selected one of the working stages, such that the electronic device locking apparatus and the electronic device are inseparable, wherein, after inserting the fixing member of the electronic device locking apparatus into the anti-theft hole of the electronic device, a central shaft of the electronic device locking apparatus is moved toward the fixing member to unfold the fixing member to engage in the anti-theft hole with the selected one of the working stages, and wherein, when the central shaft of the electronic device locking apparatus moves toward the fixing member, the central shaft pushes a rotating member to make the rotating member push to unfold the fixing member, and the rotating member is rotated to different angles according to the selected one of the working stages to push the fixing member.

2. The locking method for the electronic device as claimed in claim 1, wherein the central shaft of the electronic device locking apparatus is biased to move toward the fixing member;

the fixing member of the electronic device locking apparatus is inserted into the anti-theft hole of the electronic device after the central shaft is moved away from the fixing member by a user; and when the central shaft is released by the user, the central shaft moves toward the fixing member to unfold the fixing member to engage in the anti-theft hole with the selected one of the working stages.

3. An electronic device locking apparatus configured to secure an electronic device that has an anti-theft hole, the electronic device locking apparatus comprising:

a fixing member configured to be inserted in the anti-theft hole of the electronic device;

a stage adjusting mechanism configured to adjust the electronic device locking apparatus to multiple working stages;

a driving mechanism connected with the fixing member and the stage adjusting mechanism and selectively unfolding the fixing member to engage in the anti-theft hole based on one of the multiple working stages currently selected to which the stage adjusting mechanism adjusts, the driving mechanism including:

a central shaft, and a rotating member disposed between the central shaft and the fixing member and connected with the stage adjusting mechanism, the rotating member being rotated to different angles based on the working stages to which the stage adjusting mechanism adjusts; and a lock, wherein, when the lock is in a locking state, the stage adjusting mechanism is fixed at the current one of the working stages by the lock, and wherein, when the central shaft is moved to the fixing member:

the fixing member is unfolded to engage in the anti-theft hole based on the current one of the working stages to which the stage adjusting mechanism adjusts, and the central shaft pushes the rotating member to push to unfold the fixing member to a corresponding one of the angles based on the current one of the working stages to which the stage adjusting mechanism adjusts.

4. The electronic device locking apparatus as claimed in claim 3, wherein the central shaft is biased to move toward the fixing member; and the electronic device locking apparatus further comprises an unlocking member connected with the central shaft and selectively driving the central shaft to move away from the fixing member.

* * * * *